United States Patent
Ren et al.

(10) Patent No.: US 12,493,006 B2
(45) Date of Patent: Dec. 9, 2025

(54) SYSTEMS AND METHODS FOR SIGNAL ELECTRON DETECTION

(71) Applicant: ASML Netherlands B.V., Veldhoven (NL)

(72) Inventors: Weiming Ren, San Jose, CA (US); Zhong-wei Chen, Los Altos, CA (US); Yongxin Wang, San Ramon, CA (US)

(73) Assignee: ASML Netherlands B.V., Veldhoven (NL)

( * ) Notice: Subject to any disclaimer, the term of this patent is extended or adjusted under 35 U.S.C. 154(b) by 562 days.

(21) Appl. No.: 17/918,100

(22) PCT Filed: Apr. 1, 2021

(86) PCT No.: PCT/EP2021/058551
§ 371 (c)(1),
(2) Date: Oct. 10, 2022

(87) PCT Pub. No.: WO2021/204639
PCT Pub. Date: Oct. 14, 2021

(65) Prior Publication Data
US 2023/0137186 A1 May 4, 2023

Related U.S. Application Data

(60) Provisional application No. 63/008,639, filed on Apr. 10, 2020.

(51) Int. Cl.
*G01N 23/2251* (2018.01)
*H01J 37/244* (2006.01)
(Continued)

(52) U.S. Cl.
CPC ........ *G01N 23/2251* (2013.01); *H01J 37/244* (2013.01); *H10F 30/295* (2025.01);
(Continued)

(58) Field of Classification Search
CPC .......... G01N 23/2251; G01N 2223/07; G01N 2223/313; G01N 2223/507; H01J 37/244;
(Continued)

(56) References Cited

U.S. PATENT DOCUMENTS 6,392,231 B1 * 5/2002 Chen ................. H01J 37/28
250/396 ML
7,276,694 B1 * 10/2007 Bertsche ............ H01J 37/244
250/311

(Continued)

FOREIGN PATENT DOCUMENTS

CN 104797981 A 7/2015
JP H06318447 A 11/1994
(Continued)

OTHER PUBLICATIONS

Office Action of the Intellectual Property Office issued in related Taiwanese Patent Application No. 110111728; mailed Apr. 11, 2022 (11 pgs.).
(Continued)

*Primary Examiner* — David A Vanore
(74) *Attorney, Agent, or Firm* — FINNEGAN, HENDERSON, FARABOW, GARRETT & DUNNER, LLP

(57) ABSTRACT

Some disclosed embodiments include an electron detector comprising: a first semiconductor layer having a first portion and a second portion; a second semiconductor layer; a third semiconductor layer; a PIN region formed by the first, second, and third semiconductor layers; a power supply configured to apply a reverse bias between the first and the third semiconductor layers; and a depletion region formed within the PIN region by the reverse bias and configured to generate a detector signal based on a first subset of the plurality of signal electrons captured within the depletion region, wherein the second portion of the first semiconduc-
(Continued)

tor layer is not depleted and is configured to provide an energy barrier to block a second subset of the plurality of signal electrons and to allow the first subset of the plurality of signal electrons to pass through to reach the depletion region.

20 Claims, 14 Drawing Sheets

(51) Int. Cl.
    *H10F 30/295*     (2025.01)
    *H10F 71/00*     (2025.01)

(52) U.S. Cl.
    CPC ....... *H10F 71/121* (2025.01); *G01N 2223/07* (2013.01); *G01N 2223/313* (2013.01); *G01N 2223/507* (2013.01); *H01J 2237/057* (2013.01); *H01J 2237/2441* (2013.01); *H01J 2237/24475* (2013.01)

(58) Field of Classification Search
    CPC ......... H01J 2237/057; H01J 2237/2441; H01J 2237/24475; H10F 30/295; H10F 71/121; H10F 30/29; H10F 30/223
    See application file for complete search history.

(56) References Cited

U.S. PATENT DOCUMENTS

| | | | | |
|---|---|---|---|---|
| 8,164,069 | B2* | 4/2012 | Uchiyama | H01J 37/244 |
| | | | | 250/397 |
| 8,203,119 | B2* | 6/2012 | Degenhardt | H01J 37/244 |
| | | | | 250/311 |
| 9,048,062 | B1* | 6/2015 | Ren | H01J 37/05 |
| 9,048,063 | B1* | 6/2015 | Ren | H01J 37/12 |
| 9,673,019 | B2* | 6/2017 | Cheifetz | H01J 37/285 |
| 10,468,230 | B2* | 11/2019 | Lavely | H01J 37/256 |
| 11,830,718 | B2* | 11/2023 | Kociak | H01J 49/0063 |
| 2004/0046125 | A1* | 3/2004 | Chen | H01J 37/141 |
| | | | | 250/397 |
| 2004/0081216 | A1* | 4/2004 | Dehmubed | H01S 5/3086 |
| | | | | 257/E21.387 |
| 2005/0026310 | A1* | 2/2005 | Zhao | H01L 22/34 |
| | | | | 257/E21.527 |
| 2006/0038126 | A1* | 2/2006 | Chen | H01J 37/026 |
| | | | | 250/310 |
| 2009/0152664 | A1* | 6/2009 | Klem | G06V 40/1318 |
| | | | | 257/466 |
| 2011/0266643 | A1* | 11/2011 | Engelmann | H10F 30/2235 |
| | | | | 257/E31.087 |
| 2012/0032077 | A1* | 2/2012 | Matsumoto | H01J 37/222 |
| | | | | 250/311 |
| 2014/0042316 | A1* | 2/2014 | Barbi | H01J 37/244 |
| | | | | 250/307 |
| 2015/0145090 | A1 | 5/2015 | Margulis | |
| 2015/0256988 | A1* | 9/2015 | Wen | H04W 4/16 |
| | | | | 370/329 |
| 2016/0064180 | A1* | 3/2016 | Ren | H01J 37/1475 |
| | | | | 250/307 |
| 2016/0321066 | A1* | 11/2016 | Wang | G06F 3/0647 |
| 2016/0336142 | A1* | 11/2016 | Liu | H01J 37/28 |
| 2017/0192111 | A1* | 7/2017 | Yoon | H10F 39/189 |
| 2019/0279844 | A1* | 9/2019 | Ren | H01J 37/3177 |
| 2019/0341222 | A1* | 11/2019 | Hu | H01J 37/14 |
| 2019/0378682 | A1* | 12/2019 | Wang | H01J 37/28 |
| 2020/0027694 | A1* | 1/2020 | Wang | H01J 37/244 |
| 2020/0161079 | A1* | 5/2020 | Ren | H01J 37/143 |
| 2020/0212246 | A1* | 7/2020 | Lorito | H01J 37/28 |
| 2020/0219696 | A1* | 7/2020 | Wang | H10F 39/802 |
| 2020/0266023 | A1* | 8/2020 | Liu | H01J 37/12 |
| 2020/0286708 | A1* | 9/2020 | Wang | H01J 37/244 |
| 2020/0317504 | A1* | 10/2020 | Wang | H01J 37/12 |
| 2020/0318232 | A1* | 10/2020 | Wang | C23C 14/32 |
| 2022/0319797 | A1* | 10/2022 | Gu | H01J 37/20 |
| 2022/0393057 | A1* | 12/2022 | Wang | H01L 24/48 |
| 2023/0028799 | A1* | 1/2023 | Fang | H01J 37/243 |
| 2023/0045072 | A1* | 2/2023 | Stoschus | H01L 22/12 |
| 2023/0137186 | A1* | 5/2023 | Ren | H10F 71/121 |
| | | | | 250/306 |
| 2023/0170179 | A1* | 6/2023 | Wang | H01J 37/244 |
| | | | | 250/307 |
| 2025/0069847 | A1* | 2/2025 | Vespucci | H01J 37/263 |
| 2025/0076038 | A1* | 3/2025 | Vespucci | G01B 15/06 |

FOREIGN PATENT DOCUMENTS

| | | |
|---|---|---|
| TW | I686950 B | 3/2020 |
| TW | 202013703 A | 4/2020 |
| WO | WO 90/09681 A1 | 8/1990 |
| WO | WO 2019/053173 A1 | 3/2019 |
| WO | 2019063794 A1 | 4/2019 |
| WO | 2019233991 A1 | 12/2019 |

OTHER PUBLICATIONS

Introduction chapter from a thesis from Dr. Agata Sakic at Delft University, "Silicon Technology for Integrating High-performance low-energy electron photodiode detectors", (5 pgs.).

Bulling Anthony F et al: "Accelerated Electron Detection Using Single Photon Avalanche Diodes", (4 pgs.).

Abbas T Al et al: "Backside illuminated SPAD image sensor with 7.83 μm pitch in 3D-stacked CMOS technology", (4 pgs.).

International Search Report from the International Search Authority issued in related International Application No. PCT/EP2021/058551 mailed Jul. 21, 2021 (3 pgs.).

* cited by examiner

SYSTEMS AND METHODS FOR SIGNAL ELECTRON DETECTION

CROSS-REFERENCE TO RELATED APPLICATIONS

This application claims priority to International Application No. PCT/EP2021/058551, filed Apr. 1, 2021, and published as WO 2021/204639 A1, which claims priority of U.S. application 63/008,639 which was filed on Apr. 10, 2020. The contents of these applications are incorporated herein by reference in their entireties.

TECHNICAL FIELD

The embodiments provided herein disclose a charged-particle beam apparatus, and more particularly improved systems and methods for signal electron detection.

BACKGROUND

When manufacturing semiconductor integrated circuit (IC) chips, undesired pattern defects, as a consequence of, for example, optical effects and incidental particles, inevitably occur on a substrate (i.e., wafer) or a mask during the fabrication processes, thereby reducing the yield. Monitoring the extent of the undesired pattern defects is therefore an important process in the manufacture of IC chips. More generally, the inspection or measurement of a surface of a substrate, or other object/material, is an important process during and after its manufacture.

Pattern inspection tools with a charged particle beam have been used to inspect objects, for example to detect pattern defects. These tools typically use electron microscopy techniques, such as a scanning electron microscope (SEM). In a SEM, a primary electron beam of electrons at a relatively high energy is targeted with a final deceleration step in order to land on a sample at a relatively low landing energy. The beam of electrons is focused as a probing spot on the sample. The interactions between the material structure at the probing spot and the landing electrons from the beam of electrons cause electrons to be emitted from the surface, such as secondary electrons, backscattered electrons, or Auger electrons. The generated secondary electrons may be emitted from the material structure of the sample. By scanning the primary electron beam as the probing spot over the sample surface, secondary electrons can be emitted across the surface of the sample. By collecting these emitted secondary electrons from the sample surface, a pattern inspection tool may obtain an image representing characteristics of the material structure of the surface of the sample.

SUMMARY

The embodiments provided herein disclose a charged-particle beam apparatus, and more particularly improved systems and methods for signal electron detection.

In some embodiments, an electron detector for detecting a plurality of signal electrons generated from a sample is provided. The detector includes a first semiconductor layer having a first portion and a second portion, a second semiconductor layer adjacent to the first semiconductor layer, and a third semiconductor layer adjacent to the second semiconductor layer. The detector also includes a PIN region formed by the first, second, and third semiconductor layers. The detector may also include a power supply configured to apply a reverse bias between the first and the third semiconductor layers. The detector further includes a depletion region formed within the PIN region by the reverse bias, the depletion region comprising a portion of the second semiconductor layer, and the depletion region configured to generate a detector signal based on a first subset of the plurality of signal electrons captured within the depletion region, wherein the second portion of the first semiconductor layer is not depleted and is configured to provide an energy barrier to block a second subset of the plurality of signal electrons and to allow the first subset of the plurality of signal electrons to pass through to reach the depletion region.

In some embodiments, an electron detector for detecting a plurality of signal electrons generated from a sample is provided. The detector includes a first semiconductor layer having a first portion and a second portion, a second semiconductor layer adjacent to the first semiconductor layer. The detector also includes multiple segments of a third semiconductor layer, each of the multiple segments being adjacent to the second semiconductor layer. The detector also includes a PIN region formed by the first, second, and third semiconductor layers and a power supply configured to apply a reverse bias between the first and the third semiconductor layers. The detector further includes a depletion region formed within the PIN region by the reverse bias, the depletion region comprising a portion of the second semiconductor layer, and the depletion region configured to generate a plurality of detector signals based on a first subset of the plurality of signal electrons captured within the depletion region, wherein the second portion of the first semiconductor layer is not depleted and is configured to provide an energy barrier to block a second subset of the plurality of signal electrons and to allow the first subset of the plurality of signal electrons to pass through to reach the depletion region.

A method for manufacturing an electron detector having an energy barrier that filters out electrons based on the electrons' energy is provided. The method includes providing a semiconductor substrate having a first portion, a second portion adjacent to the first portion, and a third portion adjacent to the second portion. The method also includes forming a first semiconductor layer by doping the first portion of the substrate with a first type of dopant, forming a third semiconductor layer by doping the third portion of the substrate with a second type of dopant, and forming a second semiconductor layer in the second portion of the substrate. A doping concentration of the first type of dopant in the first semiconductor layer is determined to configure the energy barrier of the electron detector, and a thickness of the first semiconductor layer is determined to further configure the energy barrier of the electron detector.

In some embodiments, a charged particle beam apparatus for inspecting a sample is provided. The apparatus includes a charge particle beam source configured to emit a charged particle beam along a primary optical axis, an objective lens configured to focus the charged particle beam onto the sample, and an electron detector according to the embodiments described above. The electron detector is configured to detect a plurality of signal electrons generated from incidence of the charged particle beam onto the sample.

In some embodiments, a charged particle beam apparatus for inspecting a sample is provided. The apparatus includes a charge particle beam source configured to emit a charged particle beam along a primary optical axis, an objective lens configured to focus the charged particle beam onto the sample, an electron detector configured to detect a plurality of signal electrons generated from incidence of the charged particle beam onto the sample, and a passive energy filter between the electron detector and the sample.

In some embodiments, an electron detector for detecting a plurality of signal electrons generated from a sample is provided. The detector includes a first semiconductor layer having a first portion and a second portion, a second semiconductor layer adjacent to the first semiconductor layer, and a third semiconductor layer adjacent to the second semiconductor layer. The detector also includes a PIN region formed by the first, second, and third semiconductor layers. The detector further includes a depletion region formed by a reverse bias applied to the PIN region, the depletion region comprising a portion of the second semiconductor layer, and the depletion region configured to generate a detector signal based on a first subset of the plurality of signal electrons captured within the depletion region, wherein the second portion of the first semiconductor layer is not depleted and is configured to provide an energy barrier to block a second subset of the plurality of signal electrons and to allow the first subset of the plurality of signal electrons to pass through to reach the depletion region.

In some embodiments, an electron detector for detecting a plurality of signal electrons generated from a sample is provided. The detector includes a first semiconductor layer having a first portion and a second portion, a second semiconductor layer adjacent to the first semiconductor layer. The detector also includes multiple segments of a third semiconductor layer, each of the multiple segments being adjacent to the second semiconductor layer. The detector also includes a PIN region formed by the first, second, and third semiconductor layers. The detector further a depletion region formed by a reverse bias applied to the PIN region, the depletion region comprising a portion of the second semiconductor layer, and the depletion region configured to generate a plurality of detector signals based on a first subset of the plurality of signal electrons captured within the depletion region, wherein the second portion of the first semiconductor layer is not depleted and is configured to provide an energy barrier to block a second subset of the plurality of signal electrons and to allow the first subset of the plurality of signal electrons to pass through to reach the depletion region.

Other advantages of the embodiments of the present disclosure will become apparent from the following description taken in conjunction with the accompanying drawings wherein are set forth, by way of illustration and example, certain embodiments of the present disclosure.

DETAILED DESCRIPTION

Figure 1:
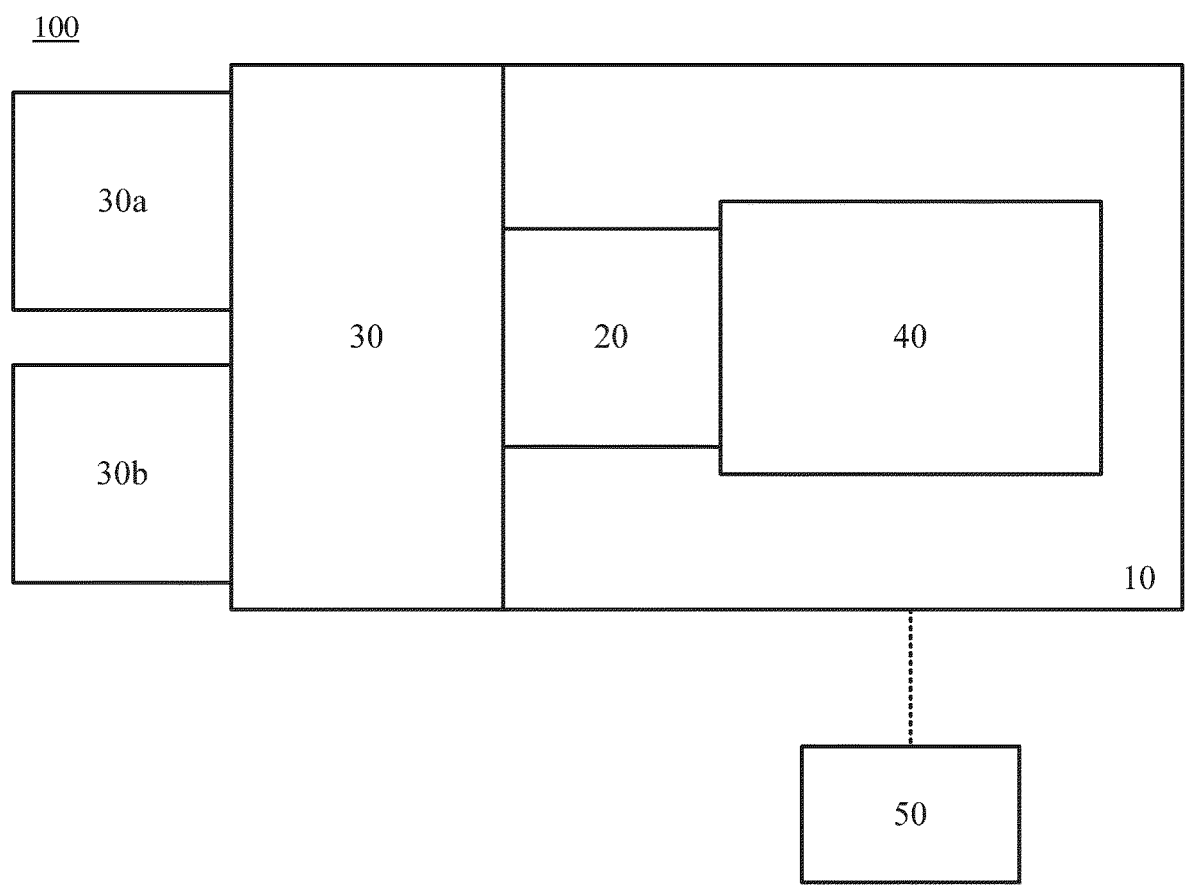
FIG. 1 is a schematic diagram illustrating a charged-particle beam inspection system, consistent with embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations. Instead, they are merely examples of apparatuses and methods consistent with aspects related to the disclosed embodiments as recited in the appended claims. For example, although some embodiments are described in the context of utilizing electron beams, the disclosure is not so limited. Other types of charged particle beams may be similarly applied. Furthermore, other imaging systems may be used, such as optical imaging, photo detection, x-ray detection, etc.

Electronic devices are constructed of circuits formed on a piece of silicon called a substrate. Many circuits may be formed together on the same piece of silicon and are called integrated circuits or ICs. The size of these circuits has decreased dramatically so that many more of them can fit on the substrate. For example, an IC chip in a smart phone can be as small as a thumbnail and yet may include over 2 billion transistors, the size of each transistor being less than 1/1000th the size of a human hair.

Making these extremely small ICs is a complex, time-consuming, and expensive process, often involving hundreds of individual steps. Errors in even one step have the potential to result in defects in the finished IC, thereby rendering it useless. Thus, one goal of the manufacturing process is to avoid such defects to maximize the number of functional ICs made in the process, that is, to improve the overall yield of the process.

One component of improving yield is monitoring the chip making process to ensure that it is producing a sufficient number of functional integrated circuits. One way to monitor the process is to inspect the chip circuit structures at various stages of their formation. Inspection can be carried out using a scanning electron microscope (SEM). An SEM can be used to image these extremely small structures, in effect, taking a "picture" of the structures. The image can be used to determine if the structure was formed properly and also if it was formed in the proper location. If the structure is defective, then the process can be adjusted so the defect is less likely to recur.

The accuracy and reliability of inspection of high-density IC chips using SEMs may depend on the imaging resolution of the system, among other things. One of the several ways to obtain and maintain high imaging resolution is to maximize the collection efficiency of signal electrons, such as secondary electrons (SE) and backscattered electrons (BSEs). When a primary electron strikes the surface of a sample, it interacts with a volume of the sample based on the landing energy, sample material, and spot size, among other things, and generates a plurality of signal electrons. SEs, which are produced from the emission of the valence electrons (e.g., outer shell electrons) of the constituent atoms of the sample, have ≤50 eV emission energies and originate from the surface or the near-surface region of the sample. BSEs, which result predominantly from an elastic collision of an electron of the electron beam with the nucleus of a constituent atom, have higher emission energies, e.g., in a range of 50 eV to the landing energy of primary electrons on a sample (as high as 1,000 to 10,000 eV or more), and often originate from deeper areas within the interaction volume of the sample, and thus can provide information associated with material composition and distribution of the sample. In some embodiments, it may be desired to have a mechanism to collect only a certain type of signal electrons, such as BSEs, to enhance the quality of obtained images. For example, maximum detection of backscattered electrons may be desirable to obtain high resolution images of underlying defects or structures from a deeper subsurface region of the sample.

In conventional SEMs, one way to enable selective collection of a certain type of signal electron may include placing an active energy filter on the path of the signal electrons between the sample and the electron detector, so that an unwanted type of signal electrons can be filtered out before reaching the surface of the electron detector. For example, the active energy filter may include an electrode (biased negatively with respect to the sample when the charged particle beam is an electron beam) that generates an electric field to block off SEs while allowing BSEs to pass through. In some embodiments, however, the electric field generated by the active energy filter may disturb the primary electrons and increase the aberrations of the objective lens, resulting in an increase the size of a probe spot on the sample, and resultantly negatively affecting the imaging resolution. Accordingly, it may be desirable to detect only BSEs without using an active filter. Some embodiments of the present disclosure are directed to charged-particle beam apparatuses and methods of forming an image of a sample. The apparatus may include an electron detector with a passive filter that provides the selective collection capability of BSEs without a need to generate an electric field.

Relative dimensions of components in drawings may be exaggerated for clarity. Within the following description of drawings, the same or like reference numbers refer to the same or like components or entities, and only the differences with respect to the individual embodiments are described. As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Reference is now made to FIG. 1, which illustrates an exemplary charged particle beam inspection system 100 such as an electron beam inspection (EBI) system, consistent with embodiments of the present disclosure. As shown in FIG. 1, charged particle beam inspection system 100 includes a main chamber 10, a load-lock chamber 20, an electron beam tool 40, and an equipment front end module (EFEM) 30. Electron beam tool 40 is located within main chamber 10. While the description and drawings are directed to an electron beam, it is appreciated that the embodiments are not used to limit the present disclosure to specific charged particles.

EFEM 30 includes a first loading port 30a and a second loading port 30b. EFEM 30 may include additional loading port(s). First loading port 30a and second loading port 30b receive wafer front opening unified pods (FOUPs) that contain wafers (e.g., semiconductor wafers or wafers made of other material(s)) or samples to be inspected (wafers and samples are collectively referred to as "wafers" hereafter). One or more robot arms (not shown) in EFEM 30 transport the wafers to load-lock chamber 20.

Load-lock chamber 20 is connected to a load/lock vacuum pump system (not shown), which removes gas molecules in load-lock chamber 20 to reach a first pressure below the atmospheric pressure. After reaching the first pressure, one or more robot arms (not shown) transport the wafer from load-lock chamber 20 to main chamber 10. Main chamber 10 is connected to a main chamber vacuum pump system (not shown), which removes gas molecules in main chamber 10 to reach a second pressure below the first pressure. After reaching the second pressure, the wafer is subject to inspection by electron beam tool 40. In some embodiments, electron beam tool 40 may comprise a single-beam inspection tool.

Controller 50 may be electronically connected to electron beam tool 40 and may be electronically connected to other components as well. Controller 50 may be a computer configured to execute various controls of charged particle beam inspection system 100. Controller 50 may also include processing circuitry configured to execute various signal and image processing functions. While controller 50 is shown in FIG. 1 as being outside of the structure that includes main chamber 10, load-lock chamber 20, and EFEM 30, it is appreciated that controller 50 can be part of the structure.

While the present disclosure provides examples of main chamber 10 housing an electron beam inspection system, it should be noted that aspects of the disclosure in their broadest sense, are not limited to a chamber housing an electron beam inspection system. Rather, it is appreciated that the foregoing principles may be applied to other chambers as well.

Figure 2:
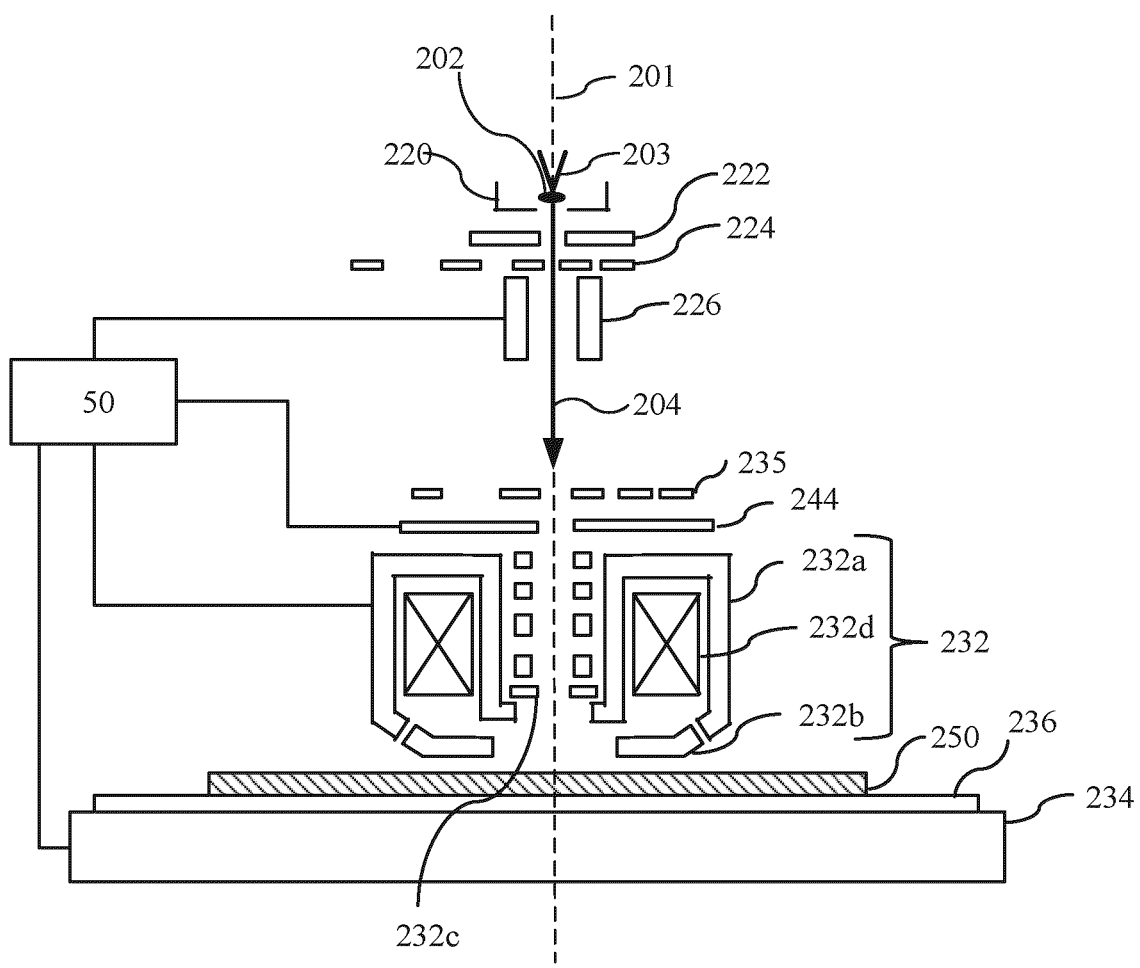
FIG. 2 is a schematic diagram illustrating an exemplary configuration of an electron beam tool that can be a part of the charged-particle beam inspection system of FIG. 1, consistent with embodiments of the present disclosure.

Reference is now made to FIG. 2, which is a schematic diagram illustrating an exemplary configuration of an electron beam tool 40 that can be a part of the charged particle beam inspection system 100 of FIG. 1, consistent with embodiments of the present disclosure. Electron beam tool 40 (also referred to herein as apparatus 40) may comprise an electron emitter, which may comprise a cathode 203, an anode 220, and a gun aperture 222. Electron beam tool 40 may further include a Coulomb aperture array 224, a condenser lens 226, a beam-limiting aperture array 235, an objective lens assembly 232, and an electron detector 244. Electron beam tool 40 may further include a sample holder 236 supported by motorized stage 234 to hold a sample 250 to be inspected. It is to be appreciated that other relevant components may be added or omitted, as needed.

In some embodiments, electron emitter may include cathode 203, an extractor anode 220, wherein primary electrons can be emitted from the cathode and extracted or accelerated to form a primary electron beam 204 that forms a primary beam crossover 202 (virtual or real). Primary electron beam 204 can be visualized as being emitted from primary beam crossover 202.

In some embodiments, the electron emitter, condenser lens 226, objective lens assembly 232, beam-limiting aperture array 235, and electron detector 244 may be aligned with a primary optical axis 201 of apparatus 40. In some embodiments, electron detector 244 may be placed off primary optical axis 201, along a secondary optical axis (not shown).

Objective lens assembly 232, in some embodiments, may comprise a modified swing objective retarding immersion lens (SORIL), which includes a pole piece 232a, a control electrode 232b, a deflector 232c (or more than one deflectors), and an exciting coil 232d. In a general imaging process, primary electron beam 204 emanating from the tip of cathode 203 is accelerated by an accelerating voltage applied to anode 220. A portion of primary electron beam 204 passes through gun aperture 222, and an aperture of Coulomb aperture array 224, and is focused by condenser lens 226 so as to fully or partially pass through an aperture of beam-limiting aperture array 235. The electrons passing through the aperture of beam-limiting aperture array 235 may be focused to form a probe spot on the surface of sample 250 by the modified SORIL lens and deflected to scan the surface of sample 250 by deflector 232c. Secondary electrons emanated from the sample surface may be collected by electron detector 244 to form an image of the scanned area of interest.

In objective lens assembly 232, exciting coil 232d and pole piece 232a may generate a magnetic field that is leaked out through the gap between two ends of pole piece 232a and distributed in the area surrounding optical axis 201. A part of sample 250 being scanned by primary electron beam 204 can be immersed in the magnetic field and can be electrically charged, which, in turn, creates an electric field. The electric field may reduce the energy of impinging primary electron beam 204 near and on the surface of sample 250. Control electrode 232b, being electrically isolated from pole piece 232a, controls the electric field above and on sample 250 to reduce aberrations of objective lens assembly 232 and control focusing situation of signal electron beams for high detection efficiency. Deflector 232c may deflect primary electron beam 204 to facilitate beam scanning on the wafer. For example, in a scanning process, deflector 232c can be controlled to deflect primary electron beam 204, onto different locations of top surface of sample 250 at different time points, to provide data for image reconstruction for different parts of sample 250.

Backscattered electrons (BSEs) and secondary electrons (SEs) can be emitted from the part of sample 250 upon receiving primary electron beam 204. Electron detector 244 may capture the BSEs and SEs and generate image of the sample based on the information collected from the captured signal electrons. If electron detector 244 is positioned off primary optical axis 201, a beam separator (not shown) can direct the BSEs and SEs to a sensor surface of electron detector 244. The detected signal electron beams can form corresponding secondary electron beam spots on the sensor surface of electron detector 244. Electron detector 244 can generate signals (e.g., voltages, currents) that represent the intensities of the received signal electron beam spots, and provide the signals to a processing system, such as controller 50. The intensity of secondary or backscattered electron beams, and the resultant beam spots, can vary according to the external or internal structure of sample 250. Moreover, as discussed above, primary electron beam 204 can be deflected onto different locations of the top surface of sample 250 to generate secondary or backscattered signal electron beams (and the resultant beam spots) of different intensities. Therefore, by mapping the intensities of the signal electron beam spots with the locations of primary electron beam 204 on sample 250, the processing system can reconstruct an image of sample 250 that reflects the internal or external structures of sample 250.

In some embodiments, controller 50 may comprise an image processing system that includes an image acquirer (not shown) and a storage (not shown). The image acquirer may comprise one or more processors. For example, the image acquirer may comprise a computer, server, mainframe host, terminals, personal computer, any kind of mobile computing devices, and the like, or a combination thereof. The image acquirer may be communicatively coupled to electron detector 244 of apparatus 40 through a medium such as an electrical conductor, optical fiber cable, portable storage media, IR, Bluetooth, internet, wireless network, wireless radio, among others, or a combination thereof. In some embodiments, the image acquirer may receive a signal from electron detector 244 and may construct an image. The image acquirer may thus acquire images of regions of sample 250. The image acquirer may also perform various post-processing functions, such as generating contours, superimposing indicators on an acquired image, and the like. The image acquirer may be configured to perform adjustments of brightness and contrast, etc. of acquired images. In some embodiments, the storage may be a storage medium such as a hard disk, flash drive, cloud storage, random access memory (RAM), other types of computer readable memory, and the like. The storage may be coupled with the image acquirer and may be used for saving scanned raw image data as original images, and post-processed images.

In some embodiments, controller 50 may include measurement circuitries (e.g., analog-to-digital converters) to obtain a distribution of the detected secondary electrons. The electron distribution data collected during a detection time window, in combination with corresponding scan path data of a primary beam 204 incident on the sample (e.g., a wafer) surface, can be used to reconstruct images of the wafer structures under inspection. The reconstructed images can be used to reveal various features of the internal or external structures of sample 250, and thereby can be used to reveal any defects that may exist in sample 250 (such as wafer).

In some embodiments, controller 50 may control motorized stage 234 to move sample 250 during inspection. In some embodiments, controller 50 may enable motorized stage 234 to move sample 250 in a direction continuously at a constant speed. In other embodiments, controller 50 may enable motorized stage 234 to change the speed of the movement of sample 250 over time depending on the steps of scanning process.

Figure 3A:
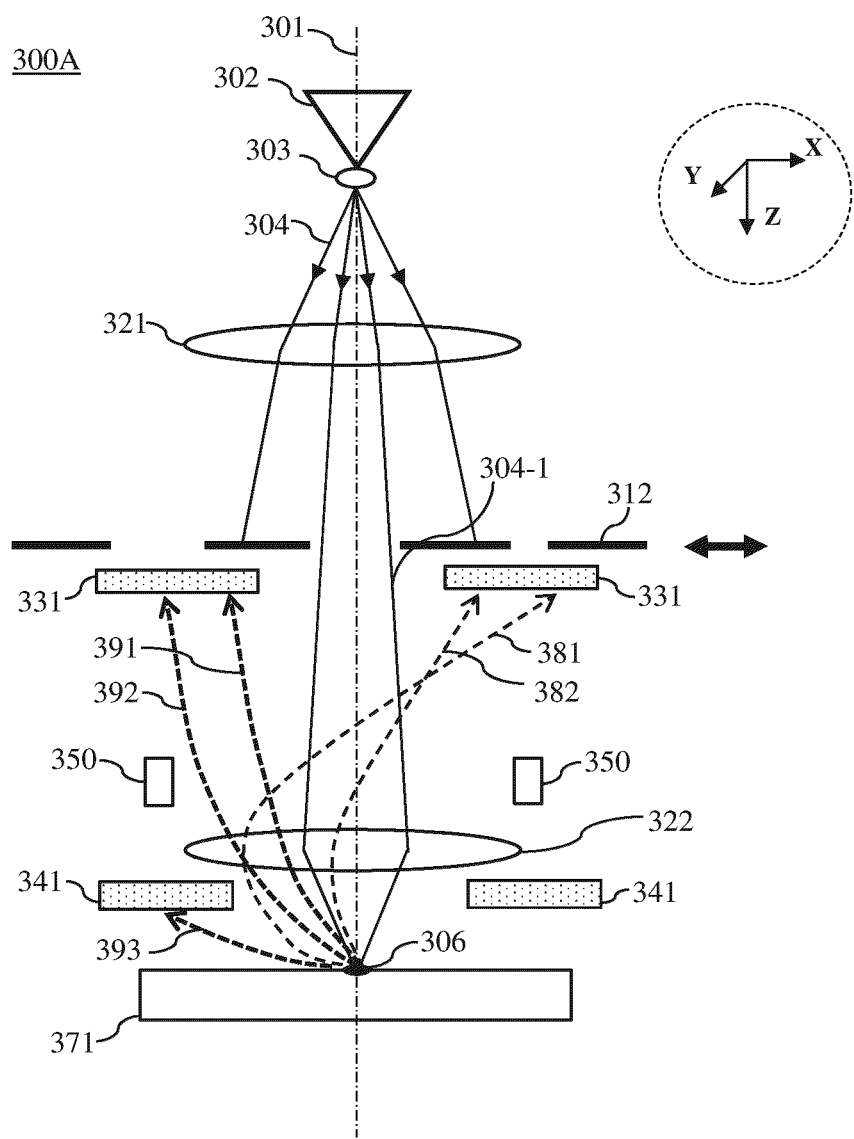
FIG. 3A is a schematic diagram shows a charged-particle beam apparatus comprising a plurality of signal electron detectors, consistent with embodiments of the present disclosure.

Reference is now made to FIG. 3A, which is a schematic diagram shows an embodiment of a charged-particle beam apparatus 300A comprising a plurality of signal electron detectors, consistent with embodiments of the present disclosure. In some conventional SEMs, apparatus 300A may comprise an electron source 302 configured to emit primary electrons from a cathode (e.g., cathode 203 of FIG. 2) and form a primary electron beam 304 that emanates from a primary beam crossover 303 (virtual or real) along a primary optical axis 301. Apparatus 300A may further comprise a condenser lens 321, a beam-limiting aperture array 312, an in-lens electron detector 331, a backscattered electron detector 341, a scanning deflection unit 350, and an objective lens assembly 322. In the context of this disclosure, an in-lens electron detector refers to a charged-particle detector (e.g., electron detector) located inside or above objective lens assembly 322 and may be arranged rotationally symmetric around the primary optical axis (e.g., primary optical axis 301). In some embodiments, an in-lens electron detector may also be referred to as a through-the lens detector, an immersion lens detector, or an upper detector. It is to be appreciated that relevant components may be added or omitted or reordered, as appropriate.

In currently existing SEMs, as shown in FIG. 3A, primary electron beam 304 may be emitted from electron source 302 and accelerated to a higher energy by an anode (e.g., anode 220 of FIG. 2). A gun aperture (e.g., gun aperture 222 of FIG. 2) may limit the current of primary electron beam 304 to a desired initial value, and may work in conjunction with beam-limiting aperture array 312 to obtain a final beam current. Primary electron beam 304 may be focused by condenser lens 321 and objective lens assembly 322 to form a small probe spot 306 on the surface of a sample 371. In some embodiments, the focusing power of condenser lens 321 and the opening size of an aperture of beam-limiting aperture array 312 may be selected to get a desired probe current and make the probe spot size as small as desired.

To obtain small spot sizes over a large range of probe current, beam-limiting aperture array 312 may comprise multiple apertures having various sizes. The beam-limiting aperture array 312 may be configured to move so that, based on a desired probe current or a probe spot size, one of the apertures of the aperture array 312 can be aligned with the primary optical axis 301. For example, as shown in FIG. 3A, one of the apertures of the aperture array 312 may be configured to generate primary electron beamlet 304-1 by blocking peripheral electrons of primary electron beam 304. In some embodiments, scanning deflection unit 350 may include one or more deflectors configured to deflect primary electron beamlet 304-1 to scan a desired area on the surface of sample 371.

As described earlier with respect to FIG. 2, interaction of electrons of primary electron beamlet 304-1 with sample 371 may generate SEs and BSEs. As is commonly known in the art, the emission of SEs and BSEs obeys Lambert's law and has a large energy spread—the electrons emerging from different depths of sample 371 have different emission energies. For example, SEs originate from the surface or the near-surface region of the sample 371 and have lower emission energies (e.g., lower than 50 eV). SEs may be useful in providing information about surface or near-surface features and geometries. On the other hand, BSEs may be generated by elastic scattering events of the incident electrons from deeper subsurface regions of sample 371, and may have higher emission energies in comparison to SEs, in a range from 50 eV to approximately the landing energy of the incident electrons. BSEs may provide compositional information of the material being inspected. The number of BSEs generated may depend on factors such as the atomic number of the material in the sample or the landing energy of primary electron beam, among other things.

In addition to focusing primary electron beam 304 on the surface of sample 371, objective lens assembly 322 may be further configured to focus the signal electrons on the surface of detector 331. As described earlier with respect to sample 250 of FIG. 2, sample 371 may be immersed in a magnetic field of objective lens assembly 322, and the magnetic field may focus the signal electrons with lower energies faster than the signal electrons with higher energies. For example, because of SE's low emission energy, objective lens assembly 322 may be able to strongly focus the SEs (such as along electron paths 381 and 382) so that a large portion of the SEs land on a detection layer of in-lens detector 331. In contrast to SEs, objective lens assembly 322 may only be able to weakly focus BSEs due to their high emission energies. Accordingly, although some BSEs with small emission angles may travel along electron paths 391 and 392 and be detected by in-lens electron detector 331, the BSEs with large emission angles, for example electrons on path 393, may not be able to be detected by in-lens electron detector 331.

In some embodiments, an additional electron detector, such as backscattered electron detector 341, can be used to detect those BSEs with large emission angles (e.g., electrons travelling on path 393). In the context of this disclosure, an emission polar angle is measured with reference to primary optical axis 301, which is substantially perpendicular to sample 371. As shown in FIG. 3A, the emission polar angle of secondary electrons in path 382 is smaller than the emission polar angles of backscattered electrons in path 391, 392, and 393. Backscattered electron detector 341 may be placed between objective lens assembly 322 and sample 371, and in-lens electron detector 331 may be placed between objective lens assembly 322 and condenser lens 321, allowing the detection of SEs as well as BSEs.

Based on the difference in emission energy, or emission angle, among other things, SEs and BSEs may be separately detected using separate electron detectors, segmented electron detectors, energy filters, and the like. For example, as shown in FIG. 3A, in-lens electron detector 331 may be configured as a segmented detector (discussed later in reference to FIG. 4C) comprising multiple detection segments arranged in a two-dimensional or a three-dimensional arrangement. In some cases, the detection segments of in-lens electron detector 331 may be arranged, e.g., radially, circumferentially, or azimuthally around primary optical axis 301.

Apparatus 300A may comprise condenser lens 321 configured to focus primary electron beam 304 so that a portion 304-1 thereof may pass through an on-axis aperture of beam-limiting aperture array 312. Condenser lens 321 may be substantially similar to condenser lens 226 of FIG. 2 and may perform similar functions. Condenser lens 321 may comprise an electrostatic, a magnetic, or a compound electromagnetic lens, among others. Condenser lens 321 may be electrically or communicatively coupled with a controller, such as controller 50 illustrated in FIG. 2. Controller 50 may apply an electrical excitation signal to condenser lens 321 to adjust the focusing power of condenser lens 321 based on factors such as the operation mode, application, desired analysis, or sample material being inspected, among other things.

Apparatus 300A may further comprise scanning deflection unit 350 configured to dynamically deflect primary electron beam 304 or primary electron beamlet 304-1 on surface of sample 371. The dynamic deflection of primary electron beamlet 304-1 may enable a desired area or a desired region of interest to be scanned, for example in a raster scan pattern, to generate SEs and BSEs for sample inspection. Scanning deflection unit 350 may comprise one or more deflectors (not shown) configured to deflect primary electron beamlet 304-1 in the X-axis or Y-axis. As used herein, X-axis and Y-axis form Cartesian coordinates, and primary electron beam 304 propagates along primary optical axis 301 which is aligned with Z-axis. X-axis refers to the horizontal axis or the lateral axis extending along the width of the paper, and Y-axis refers to the vertical axis extending in-and-out of the plane of the paper.

Figure 3B:
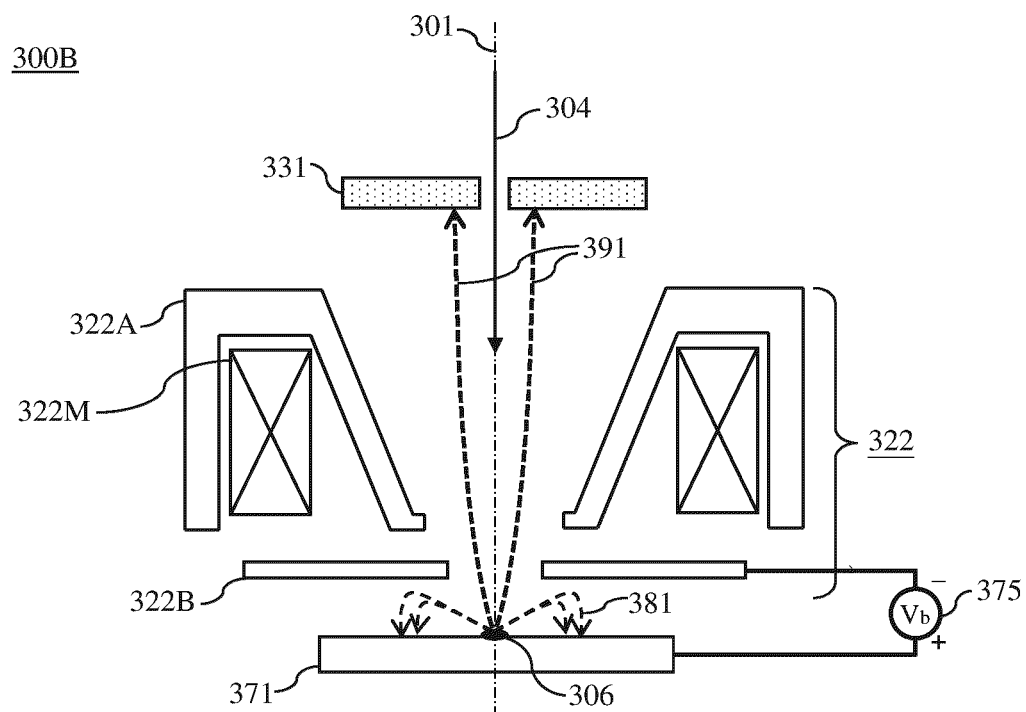
FIGS. 3B and 3C are schematic diagrams of a charged-particle beam apparatus comprising a signal electron detector with an active energy filter.

Reference is now made to FIG. 3B, which illustrates a schematic diagram of an embodiment of a charged-particle beam apparatus 300B comprising a charged-particle detector and an active energy filter. Apparatus 300B may comprise a magnetic objective lens assembly 322. In some embodiments, objective lens assembly 322 may comprise a compound electromagnetic lens including a magnetic lens 322M and an electrostatic lens formed by an inner pole piece 322A (similar to pole piece 232a of FIG. 2), and a control electrode 322B (similar to control electron 232b of FIG. 2), which work in conjunction to focus beam 304 at sample 371.

One of the ways to selectively detect signal electrons from sample 371, for example SEs versus BSEs, is to filter out a certain type of electrons based on their emission energies with an active energy filter. As shown in FIG. 3B, in some embodiments, control electrode 322B may be placed to form an energy filter between sample 371 and in-lens electron detector 331. In some embodiments, control electrode 322B may be disposed between sample 371 and magnetic lens 322M of objective lens assembly 322. When control electrode 322B is biased to a voltage by power supply 375 with reference to sample 371, an electric field is generated between control electrode 322B and sample 371, resulting in an electrostatic potential barrier for the signal electrons. The electrostatic potential barrier blocks off signal electrons that have emission energies lower than a threshold energy level of the barrier. It is appreciated that an "active filter" means an electron filter using active components, such as an electrode generating an "active" electric field—in contrast to a "passive filter" that uses only passive elements.

In an example, control electrode 322B is biased negatively with reference to sample 371 such that the negatively charged signal electrons (e.g., the SEs on path 381) are reflected back to sample 371 because the SEs on path 381 do not have enough energy to pass through the energy barrier. On the other hand, signal electrons which have emission energies higher than the threshold energy level of the barrier (e.g., the BSEs on path 391) can overcome the energy barrier formed by control electrode 322B and propagate towards in-lens electron detector 331. Accordingly, in-lens electron detector 331 may be configured as a backscattered electron detector. It is appreciated that 381 and 391 indicate paths of example SEs and BSEs generated from sample 371, respectively.

Figure 3C:
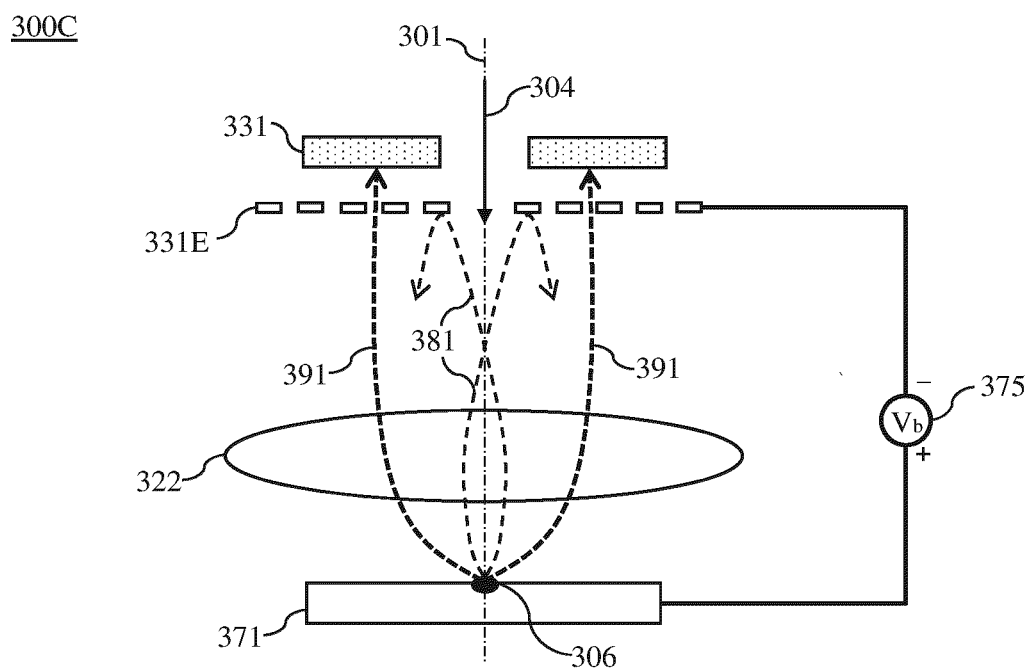

Reference is now made to FIG. 3C, which illustrates a schematic diagram of an embodiment of a charged-particle beam apparatus 300C comprising a charged-particle detector and an active energy filter. In comparison to apparatus 300B of FIG. 3B, apparatus 300C comprises an energy filter disposed near in-lens electron detector 331. The active energy filter, as shown in FIG. 3C, may comprise a mesh-type electrode 331E configured to reflect signal electrons with low emission energies (e.g., the SEs on path 381) back towards sample 371 or objective lens assembly 322, and allow signal electrons with high emission energies (e.g., the BSEs on path 391) to be incident on a detection layer of in-lens electron detector 331. In some embodiments, mesh-type electrode 331E may comprise a mesh-like structure fabricated from an electrically conducting material, such as a metal, an alloy, a semiconductor, or a composite, among other things. Mesh-type electrode 331E may be disposed between objective lens assembly 322 and in-lens electron detector 331. In some embodiments, mesh-type electrode 331E may be disposed closer to in-lens electron detector 331 than objective lens assembly 322.

Detection and inspection of some defects in semiconductor fabrication processes, such as buried particles resulting from photolithography, metal deposition, dry etching, or wet etching, among other things, may benefit from inspection of sample surface features as well as compositional analysis of features below the sample surface. Accordingly, a user may utilize information obtained from electron detectors which can selectively detect SEs or BSEs to identify the defect(s), analyze the composition of the defect(s), and adjust process parameters based on the obtained information. In a charged particle beam apparatus (such as a SEM), the collection efficiency for BSEs may be improved by using an energy filter or additional electron detectors, as discussed in reference to FIGS. 3A-3C. For example, as illustrated in FIGS. 3B and 3C, an active energy filter utilizing an electric field may be used to separate SEs from BSEs, and thus improve individual collection efficiencies.

However, in some embodiments, an active energy filter may pose some drawbacks to the overall performance of the inspection system. For example, placing the negatively biased energy filter closer to the sample (as illustrated in FIG. 3B) may increase the aberrations of the objective lens assembly and increase the size of probe spot 306, thereby adversely impacting the imaging resolution. As an alternative, the active energy filter may be placed closer to the in-lens electron detector (e.g., mesh-type electrode 331E place near the detector 331 as illustrated in FIG. 3C) to minimize the impact on the aberrations of the objective lens assembly. In such configuration, however, the primary electron beam 304 may be directly influenced by the energy filter, thereby enlarging the size of probe spot 306. To avoid the electric field influence on the primary electron beam, a shielding mesh or box (not shown) may be used to enclose detector 331 and electrode 331E. But the shielding box may limit the detector shape (e.g., requiring a large center hole of detector 331), which may hinder the detection of signal electrons with small emission angles. In some configurations, to reduce the influence on the primary electron beam and improve the detection rate of signal electrons with small emission angles, a beam separator (not shown) may be used to deflect the signal electrons away from primary optical axis 301 towards a detector placed on a secondary optical axis (not shown). But, even in this configuration, an active energy filter may still be needed for SE filtering, and accordingly the shielding mesh or box may need to be implemented. Furthermore, the beam separator may add undesirable aberrations to the incident primary electron beam, thereby negatively affecting the imaging resolution.

Figure 4A:
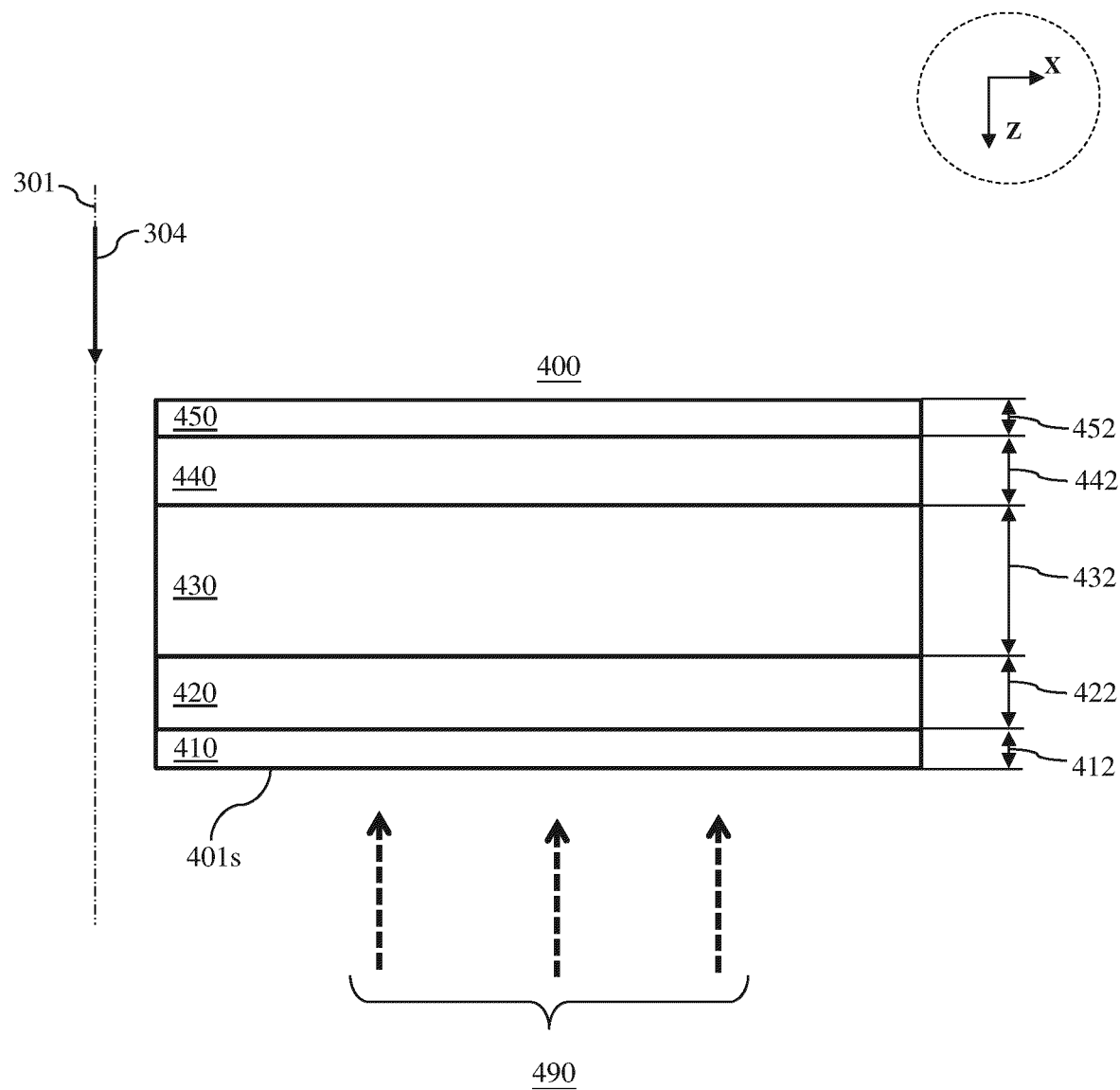
FIG. 4A is a schematic diagram of an exemplary signal electron detector, consistent with embodiments of the present disclosure.

Reference is now made to FIG. 4A, which illustrates a diagram of an exemplary structure of a signal electron detector 400 taken along a cross section in the thickness direction of the signal electron detector, consistent with embodiments of the present disclosure. Signal electron detector 400 may be a part of a charged-particle beam apparatus, such as apparatus 300A of FIG. 3A. The detector 400 may be aligned with a primary optical axis 301 of the charged-particle beam apparatus. A primary electron beam 304 travels in the +Z direction (from the top to the bottom of FIG. 4A). Signal electrons 490 generated from a sample (not shown) travel in the −Z direction (from the bottom to the top of FIG. 4A) to enter the detector 400 from a first surface 401s of the detector 400.

In some embodiments, signal electron detector 400 may be based on a PIN diode structure comprising an intrinsic semiconductor layer between a p-type semiconductor layer and an n-type semiconductor layer, hence creating a P-I-N structure. FIG. 4A shows a five-layer PIN electron detector including a first metal layer 410, a first semiconductor layer 420, a second semiconductor layer 430, a third semiconductor layer 440, and a second metal layer 450 along the thickness direction (the −Z direction) of the detector 400.

The five layers (layers 410-450) have thicknesses of 412, 422, 432, 442, and 452, respectively.

The first metal layer 410 and the second metal layer 450 at the bottom and the top of the detector 400 may form electrodes that are configured to apply a bias voltage to the detector 400. For example, first metal layer 410 may function as an anode and second metal layer 450 may function as a cathode of the detector 400. In addition, the two metal layers may protect the internal semiconductor layers. Although FIG. 4A illustrates embodiments in which the signal electrons enter from the anode side, it is appreciated that, in different embodiments, the signal electrons may enter from the cathode side.

First metal layer 410 may be configured to receive signal electrons 490 incident on the surface 401s of the electron detector 400. First metal layer 410 may be thin (e.g., in a range of 10 to 200 nm) and made of light metal to reduce scattering and energy loss of the incoming electrons. For example, a material of first metal layer 410 may be aluminum or other metal that is highly conductive and easily penetrable by signal electrons. The thickness 412 and the material of first metal layer 410 may be determined based on a consideration of blocking of particles other than incident electrons to reduce noise or filtering out some signal electrons based on their emission energy (e.g., filtering out SEs with very low emission energy).

First semiconductor layer 420 is formed adjacent to first metal layer 410. In some embodiments, first semiconductor layer 420 may comprise a p-type semiconductor. For example, first semiconductor layer 420 may be doped with trivalent impurities, such as boron, aluminum, gallium, etc., so as to create free holes. First semiconductor layer 420 may be a heavily doped region, such as a P+ region. A portion of the first semiconductor layer 420 may form an energy barrier that selectively filters out a certain type of incoming signal electrons. The doping concentration and the thickness 422 of first semiconductor layer 420 may be determined based on desired characteristics of the energy filter, such as the threshold or cutoff energy level of the filter. Further details on the operation of the energy filter are provided below with respect to FIGS. 4B and 4C. First metal layer 410 may be deposited on top of first semiconductor layer 420. Thus, first semiconductor layer 420 may be coated and protected by first metal layer 410.

Second semiconductor layer 430 is formed adjacent to first semiconductor layer 420. In some embodiments, second semiconductor layer 430 may comprise an intrinsic semiconductor region. For example, second semiconductor layer 430 may be an undoped pure semiconductor, or slightly n-doped or p-doped without any significant dopant species present. Second semiconductor layer 430 may have a doping concentration lower than doping concentrations of other layers of the electron detector 400. Second semiconductor layer 430 may have a doping concentration that is set so that it has a high resistance as a result of being lightly doped. In some embodiments, signal electron detector 400 may be formed from a silicon wafer in which case second semiconductor layer 430 may be an N− region. Thickness 432 of second semiconductor layer 430 between first semiconductor layer 420 and third semiconductor layer 440 may be determined based on the range of expected emission energy levels of received signal electrons.

Third semiconductor layer 440 is formed adjacent to second semiconductor layer 430. In some embodiments, third semiconductor layer 440 may comprise an n-type semiconductor region. For example, third semiconductor layer 440 may be doped with pentavalent impurities, such as phosphorous, antimony, arsenic, etc., so as to create free electrons. Similar to first semiconductor layer 420, third semiconductor layer 440 may be a heavily doped region, such as a N+ region.

Second metal layer 450 may be deposited on third semiconductor layer 440. A material of second metal layer 450 may be metal with high surface conductivity, such as aluminum or copper. Unlike first metal layer 410, second metal layer 450 may not need to be highly electron penetrable as, in some embodiments, signal electrons are not entering through second metal layer 450.

Figure 4B:
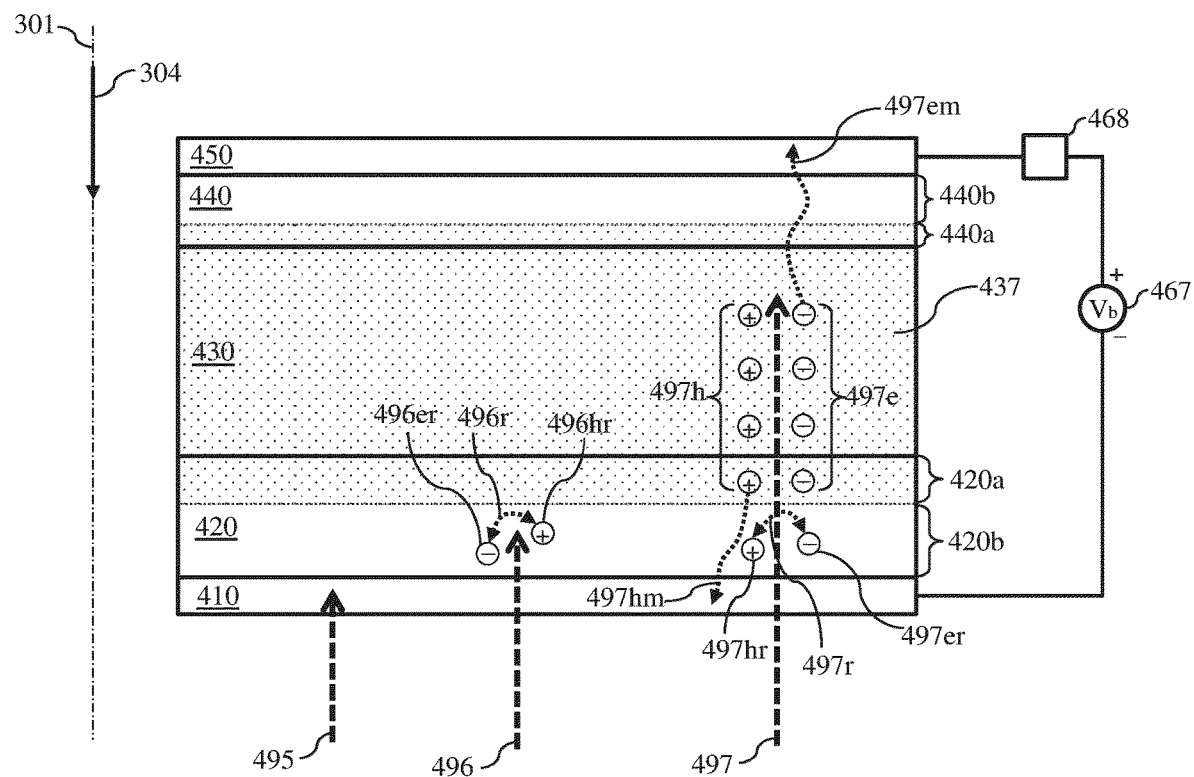
FIGS. 4B and 4C are illustrations showing exemplary operations of the signal electron detector of FIG. 4A, consistent with embodiments of the present disclosure.
Figure 4C:
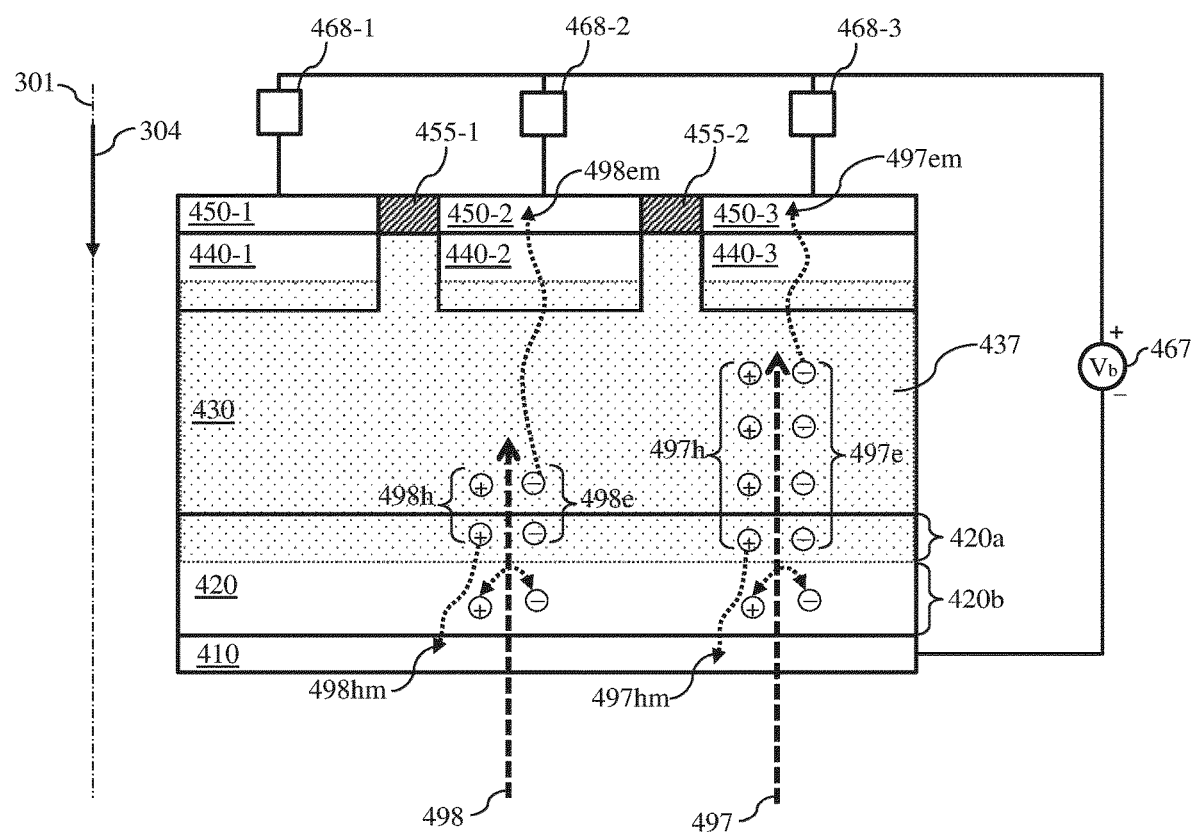

FIGS. 4B and 4C are illustrations showing exemplary operations of the signal electron detector of FIG. 4A, consistent with embodiments of the present disclosure.

First metal layer 410 and second metal layer 450 may be connected to power supply 467. As two metal layers 410 and 450 are formed directly on the adjacent semiconductor layers (420 and 440), an electrical connection may be formed between the three semiconductor layers (420, 430, 440) and power supply 467 through the metal layers. Power supply 467 may be configured to provide a reverse bias to the PIN region formed by the first, second, and third semiconductor layers-connecting a negative and positive terminal of power supply 467 to first metal layer 410 (anode) and second metal layer 450 (cathode), respectively. The resultant electric potential difference between first metal layer 410 and second metal layer 450 may create an internal electric field through the PIN region. In some embodiments, power supply 467 may be directly connected to first semiconductor layer 420 and third semiconductor layer 440, as those semiconductor layers have low resistance due to the high doping concentration.

Under a reverse bias condition in normal operation, free charge carriers (e.g., free electrons and holes) are removed away by the electric field, and therefore a depletion region 437 may be formed within the volume of the detector body, specifically within the PIN region. As a result, under reverse bias, there may be substantially no bias current flowing through the detector (except a very small leakage current). In some embodiments, depletion region 437 may exist almost completely within second semiconductor layer 430 (the intrinsic semiconductor region). In some embodiments, depletion region 437 may expand beyond second semiconductor layer 430 forming a depleted portion (420a) within first semiconductor layer 420 and a depleted portion (440a) within third semiconductor layer 440. The other portion of first semiconductor layer 420—a nondepleted portion (420b)—may remain having free holes. Similarly, the other portion of third semiconductor layer 440—a nondepleted portion (440b)—may remain having free electrons.

As described earlier, incoming signal electrons may have a different emission energy. As some signal electrons or charged particles may have very low emission energy (e.g., electrons 495), they may be blocked off or scattered by the first metal layer. Some signal electrons (e.g., electrons 496 and 497) may have higher emission energy to reach beyond first metal layer 410.

Anytime when a signal electron (such as electrons 496 and 497) enters the detector body after passing first metal layer 410, the signal electron may start interacting with the semiconductor material and generating electron-hole pairs (e.g., 496er-496hr, 497er-497hr, 497e-497h). The signal electrons keep losing energy as they interact with the detector to form electron-hole pairs.

As shown in FIG. 4B, some signal electrons (e.g., electron 496) may lose all their energy while generating electron-hole pairs (such as electron-hole pair 496er-496hr) in the nondepleted portion 420b of first semiconductor region 420, thereby failing to reach depletion region 437. In some embodiments, some of the generated electrons (e.g., electrons 496er) may themselves contribute to generate other electron-hole pairs (not shown). These generated electron-hole pairs (e.g., pair 496er-496hr and other pairs generated by the electron 496er) outside the depletion region 437 may be drifted slowly because the electric field outside of the depletion region 437 is relatively weak. Therefore, there is high probability that the generated electrons and holes are recombined with each other or with any other nearby free opposite carriers (e.g., as shown by the arrow 496r). Due to this quick recombination, the generated electron-hole pairs (e.g., pairs 496er-496hr) may not be able to contribute to generate a drift current, and, resultantly, no detector signal may be generated by the signal detecting unit 468.

Only those incoming signal electrons with sufficiently high emission energy (e.g., electrons 497) can go through and reach beyond nondepleted portion 420b of first semiconductor layer 420. When passing nondepleted portion 420b, signal electrons 497 may lose some of the energy for generating electron-hole pairs (e.g., 497er-497hr). But the initial emission energy (before entering the detector body) of signal electrons 497 may be high enough so that the electrons may reach the depletion region 437 with certain energy left to generate more electron-hole pairs 497e-497h within depletion region 437. Furthermore, some of the generated electrons (e.g., electrons 497er) may have enough energy to pass through the nondepleted portion 420b and reach the depletion region 437. These generated electrons may also contribute to generate other electron-hole pairs within the depletion region 437.

Electron-hole pairs 497e-497h generated within the depletion region 437 may be separated by the electric field (formed by the reverse bias as described above), rather than being recombined. For example, electrons 497e may be directed toward third semiconductor layer 440 (N+ region) as illustrated by arrow 497em, while holes 497h may be directed toward first semiconductor layer 420 (P+ region) as illustrated by arrow 497hm. Accordingly, those electrons 497e and holes 497h may eventually reach the electrodes at the top and bottom of the detector (e.g., the cathode—second metal layer 450; the anode—first metal layer 410) respectively and generate an electric current. In some embodiments, signal detecting unit 468 may measure this electric current and generate a corresponding detector signal. In some embodiments, signal detecting unit 468 may comprise a transimpedance amplifier (TIA) connected between the power supply 467 and the detector to process the current detector signals.

As described above, metal layer 410 and first semiconductor layer 420 in combination provide an energy barrier that filters out incoming signal electrons with emission energies lower than the energy barrier—the amount of initial energy needed to reach depletion region 437. In this way, incoming signal electrons with different energies can be separated and selectively detected without using an active energy filter, as described earlier with respect to FIGS. 3B and 3C.

In some embodiments, the energy barrier may be increased as the thickness of nondepleted region 420b increases. For example, the energy barrier in logarithmic scale may be proportional to the thickness of nondepleted region 420b in logarithmic scale. In other words, as the thickness of nondepleted region 420b increases, the energy barrier may also increase so that signal electrons with higher emission energy will be filtered out. The thickness of nondepleted region 420b may be determined based on multiple factors, such as the bias voltage, the material used to for the detector body (e.g., silicon), the doping profile of the semiconductor layers, or the thickness of the first, second, and third semiconductor layers (420, 430, 440), among others. For example, under the same bias voltage, the same device structure, and the same doping concentrations, to a certain extent, making first semiconductor layer 420 thicker may result in a thicker nondepleted region 420b. In some embodiments, a doping concentration of first semiconductor layer 420 may be changed to configure the thickness of nondepleted region 420b.

In some embodiments, a device simulation based on the known detector structure may be performed to determine an appropriate thickness of nondepleted region 420b given a predefined desired level of the energy barrier. For example, to separate BSEs from SEs, a detector may be desired to have an energy barrier that is approximately equal to the sum of 50 eV and the energy that the signal electron acquired from the acceleration voltage in the column of the electron beam apparatus. To configure the signal electron detector to have such energy barrier, a device simulation can be performed to determine various manufacturing process knobs (such as doping profiles, thicknesses of semiconductor layers, the bias voltage, etc.) which, when set properly, can provide the appropriate thickness of nondepleted region 420b that corresponds to the desired level of the energy barrier.

FIG. 4C shows a segmented signal electron detector which operates in the same way as the signal electron detector shown in FIG. 4B, except the third semiconductor layer and the second metal layer are segmented to generate multiple detector signals based on the relative positions where the incoming signal electrons are captured. In some embodiments, the electron detector may comprise multiple segments of a third semiconductor layer (e.g., 440-1, 440-2, 440-3). The materials or doping profiles of those segments 440-1, 440-2, 440-3 may be substantially similar to the third semiconductor layer 440 of FIG. 4B. The electron detector may further comprise multiple segments of a second metal layer (e.g., 450-1, 450-2, 450-3), each of which is formed directly on the adjacent third semiconductor layer segment (440-1, 440-2, or 440-3). When signal electron 498 reaches depletion region 437, electron-hole pairs (e.g., 498e-498h) are generated, and the majority of those electrons 498e may move towards the closest segment 440-2 of the third semiconductor layer. Accordingly, a detector signal corresponding to electrons 498 may be collected by signal detecting unit 468-2 which is electrically connected to metal layer segment 450-2 and semiconductor layer segment 440-2. Similarly, a detector signal generated by incoming signal electron 497 may be collected by signal detecting unit 468-3.

Figure 5A:
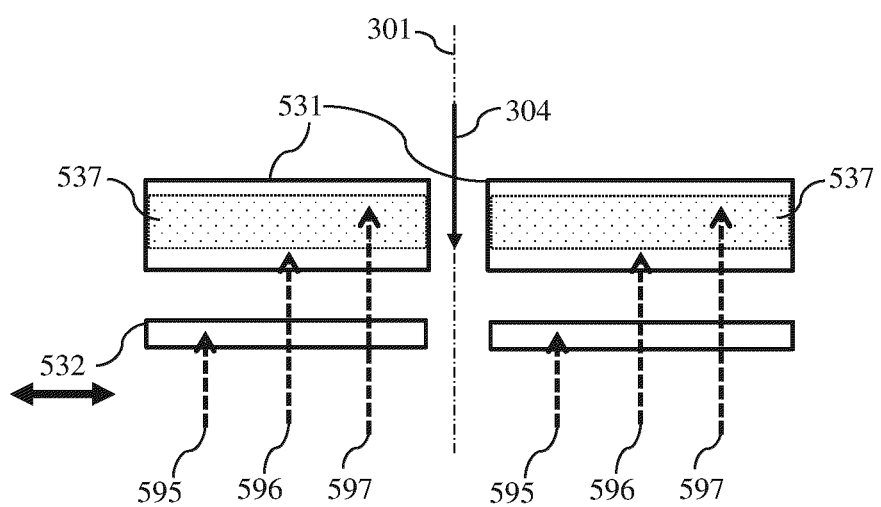
FIGS. 5A and 5B are schematic diagrams of an exemplary signal electron detector with an external passive energy filter, consistent with embodiments of the present disclosure.
Figure 5B:
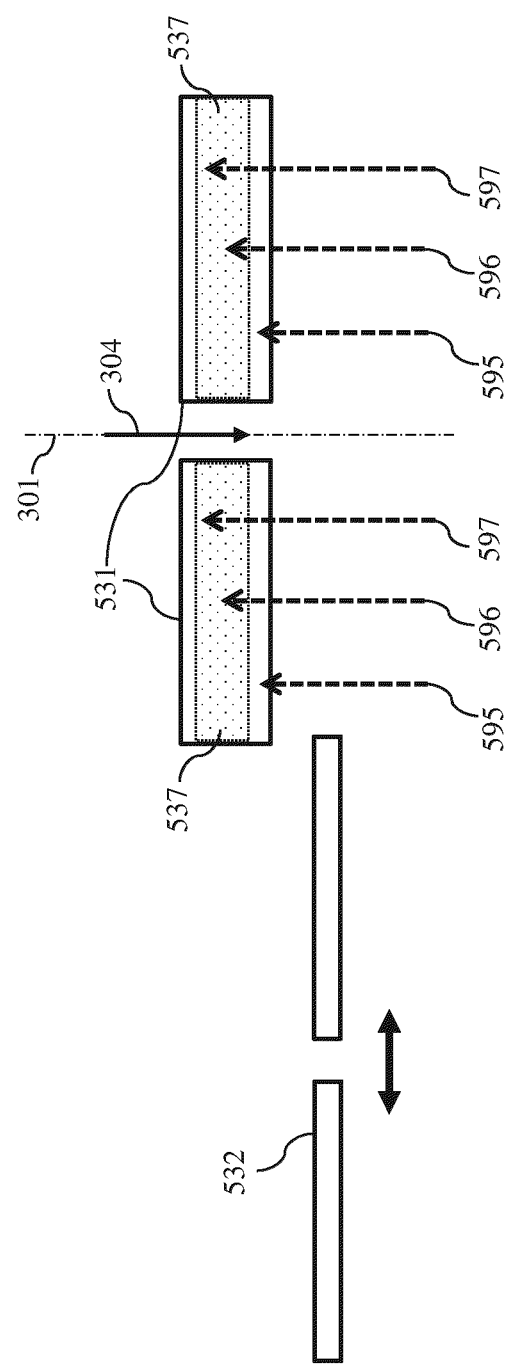

Reference is now made to FIGS. 5A and 5B, which are schematic diagrams of an exemplary signal electron detector 531 with an external passive energy filter 532, consistent with embodiments of the present disclosure. In some embodiments, signal electron detector 531 may be a signal electron detector having a built-in passive energy filter as described in FIGS. 4A-4C. In some embodiments, signal electron detector 531 may be a conventional electron detector without a built-in passive energy filter.

As shown in FIGS. 5A and 5B, signal electron detector 531 may comprise a PIN diode structure similar to the signal detector shown in FIGS. 4A-4C. For example, signal electron detector 531 may be reverse biased to create depletion region 537. A nondepleted region (not shown) for detector

531 may provide a built-in energy barrier to filter out signal electrons having energy lower than a predefined threshold energy level.

In some embodiments, external passive energy filter 532 may be used to provide an extra energy barrier in addition to the built-in energy barrier of the detector 531. External passive energy filter 532 may be a plate made of materials capable of attenuating the energy of the incoming signal electrons. For example, external passive energy filter 532 may comprise a semiconductor material (such as silicon nitride) or electric conduction material (such as aluminum film), which provide an attenuation capability while also providing a certain level of electric conductivity to discharge any charge that may build up within energy filter 532 from the incidence of the signal electrons. External passive filter 532 may have a center opening aligned with the primary optical axis of the inspection apparatus to enable a primary beam 304 to pass through. The energy barrier of external passive energy filter 532 may be determined, e.g, by adjusting the thickness or material of the plate.

In some embodiments, external passive energy filter 532 may be movable between a first position for a high filtering mode (as shown in FIG. 5A) and a second position for a low filtering mode (as shown in FIG. 5B). When the inspection apparatus operates in a high filtering mode, external passive energy filter 532 may be positioned in the first position between a sample (not shown) and signal electron detector 531. In the high filtering mode, external passive energy filter 532 may be configured to provide an extra energy barrier in addition to the built-in energy barrier of the detector 531. The effective total energy barrier for the incoming signal electrons may become the sum of the built-in energy barrier of the detector 531 and the extra energy barrier of external passive energy filter 532. For example, FIGS. 5A and 5B shows three exemplary incoming signal electrons 595, 596, and 597. The emission energy of electrons 595 may be lower than the extra energy barrier of external passive energy filter 532. The emission energy of electrons 596 may be higher than the extra energy barrier of external passive energy filter 532 but lower than the effective total energy barrier. The emission energy of electrons 597 may be higher than the effective total energy barrier. With external passive energy filter 532 positioned in the first position, signal electrons 595 and 596 are filtered out as their energies are lower than the effective total energy barrier, and only signal electrons 597 may reach depletion region 537 to be detected.

When the inspection apparatus operates in the low filtering mode, external passive energy filter 532 may be positioned in the second position away from the detector 531 so that external passive energy filter 532 would not affect any incoming signal electrons. Accordingly, in the low filtering mode, the incoming signal electrons are filtered only by the built-in energy barrier of the detection 531. For example, as shown in FIG. 5B, with external passive energy filter 532 positioned in the second position, only signal electron 595 may be filtered out, while signal electrons 596 and 597 may reach depletion region 537 to be detected.

Reference is now made to FIGS. 6A-6F, which are schematic diagrams of exemplary charged-particle beam apparatuses comprising the signal electron detector and the external passive energy filter according to FIGS. 5A and 5B, consistent with embodiments of the present disclosure.

Figure 6A:
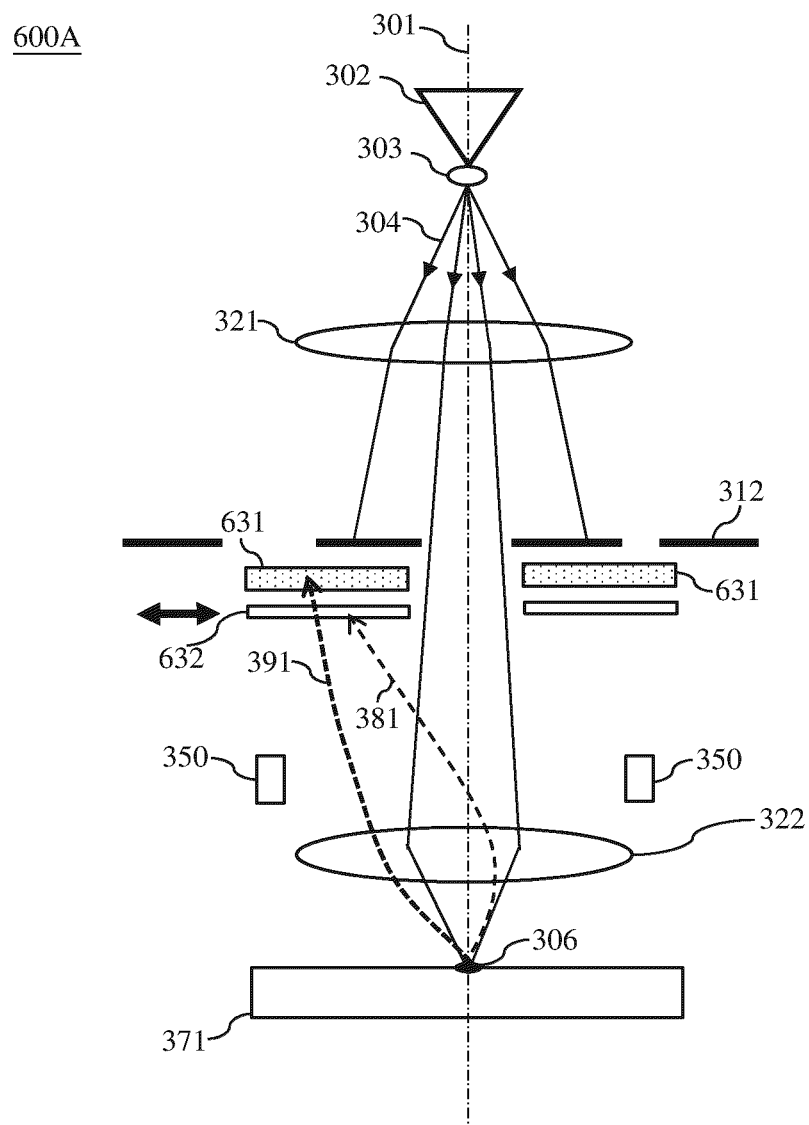
FIGS. 6A-6F are schematic diagrams of exemplary charged-particle beam apparatuses comprising the signal electron detector and the external passive energy filter according to FIGS. 5A and 5B, consistent with embodiments of the present disclosure.

FIG. 6A shows an exemplary charged-particle beam apparatus 600A, similar to the charged-particle beam apparatus 300A of FIG. 3A, consistent with some embodiments of the present disclosure. A movable external passive energy filter 632 (similar to the movable external passive energy filter 532 shown in FIGS. 5A and 5B) may be used within the charged-particle beam apparatus 600A. Apparatus 600A may comprise a signal electron detector 631, which may be a signal electron detector having a built-in passive energy filter as described in FIGS. 4A-4C, or a conventional electron detector without a built-in passive energy filter.

Similar to FIG. 5A, when apparatus 600A operates in a high filtering mode, external passive energy filter 632 may be positioned in a first position between a sample 371 and signal electron detector 631. In the high filtering mode, external passive energy filter 632 may be configured to provide an extra energy barrier in addition to the built-in energy barrier of the detector 631. The effective total energy barrier for the incoming signal electrons may become the sum of both energy barriers of the detector 631 and the filter 632. For example, as shown in FIG. 6A, with external passive energy filter 632 positioned in the first position, signal electrons 381 (e.g., electrons with low emission energies, such as SEs) may be filtered out because their energy is lower than the effective total energy barrier, and only signal electrons 391 (comprising electrons with emission energies higher than the effective total energy barrier, such as BSEs) may reach a depletion region of the detector 631 to be detected.

When apparatus 600A operates in the low filtering mode, external passive energy filter 632 may be positioned in a second position away from the detector 631 so that the effective total energy barrier may be decreased, thereby allowing signal electrons with lower energy (e.g., SEs on path 381) to also be detected by detector 631.

Figure 6B:
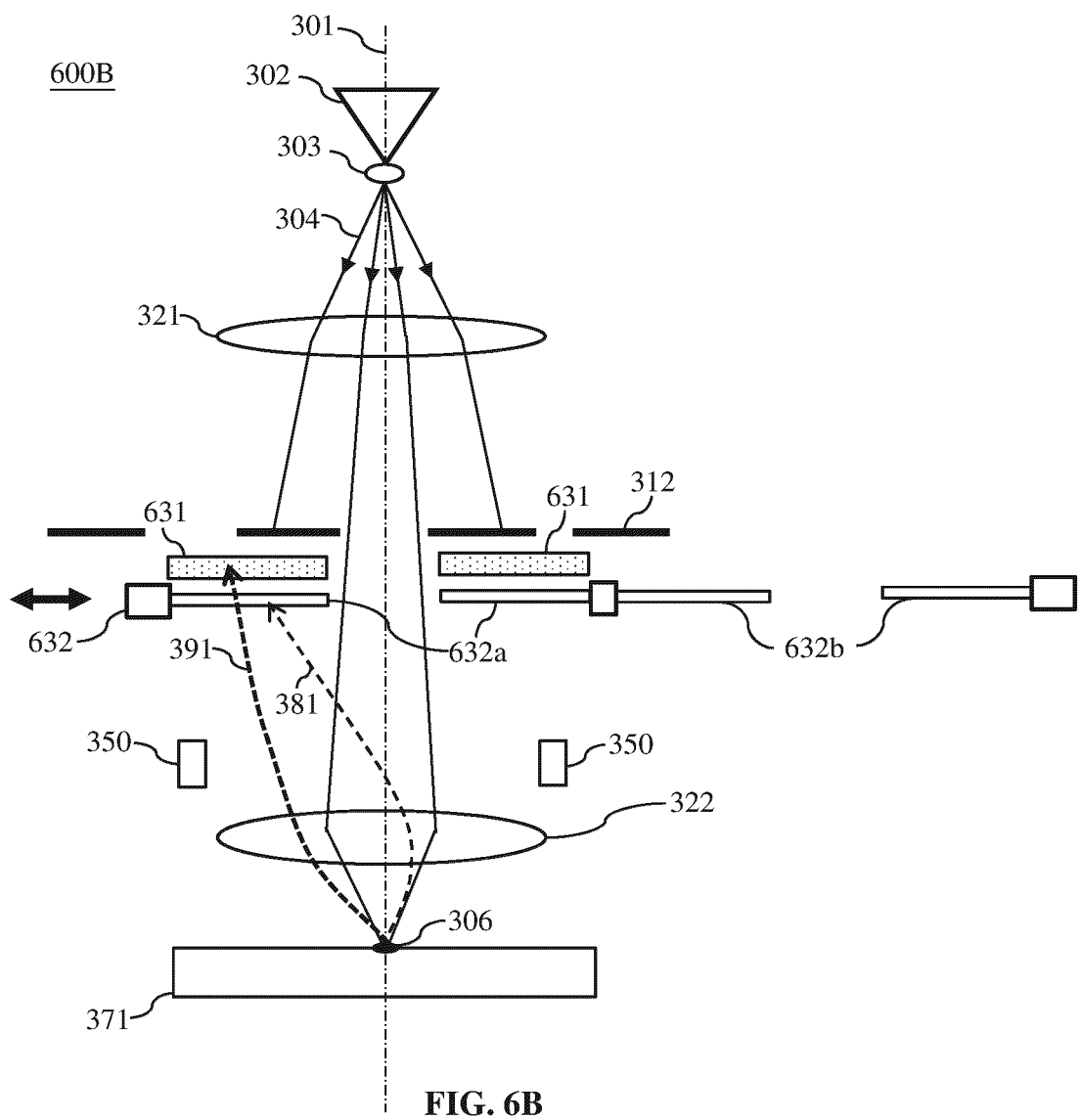
Figure 6C:
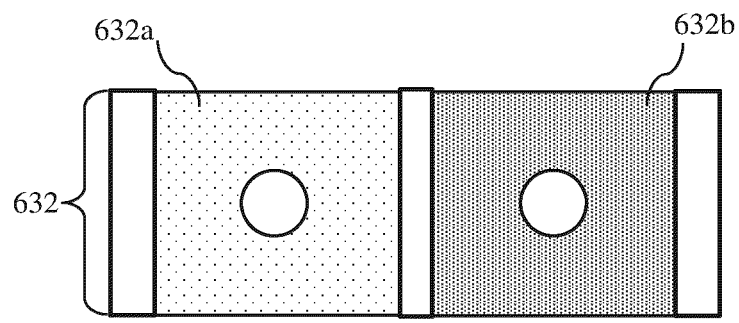

FIG. 6B shows another example (600B) of a charged-particle beam apparatus with a movable passive energy filter, consistent with some embodiments of the present disclosure Similar to the apparatus 600A in FIG. 6A, the apparatus 600B may comprise a signal electron detector 631, which may be a signal electron detector having a built-in passive energy filter as described in FIGS. 4A-4C, or an electron detector without a built-in passive energy filter. In some embodiments, the movable external passive energy filter 632 may comprise multiple filtering zones (e.g., filtering zones 632a and 632b). In some embodiments, as shown in FIG. 6C, the movable external passive energy filter 632 may comprise a filtering plate with multiple filtering zones, with each filtering zone having a center hole allowing a primary beam 304 to pass through. Each filtering zone 632a or 632b may provide a different level of energy barrier. As described earlier, the energy barrier of external passive energy filter zones 632a and 632b may be determined by adjusting the thickness or material of each filter zone plate.

In some embodiments, apparatus 600B may operate in various filtering modes, such as a high/medium/low filtering modes. When the apparatus 600B operates in the high filtering mode, a filtering zone with the higher energy barrier (e.g., 632a) may be positioned in front of the electron detector 631, thereby providing the maximum level of electron filtering. When the apparatus operates in the medium filtering mode, a filtering zone with the lower energy barrier (e.g., 632b) may be positioned in front of the electron detector 631, thereby providing a medium level of electron filtering. When the apparatus 600B operates in the low filtering mode, external passive energy filter 632 may be positioned away from the electron detector 631 (no filtering zone in front of the detector 631), thereby providing the minimum level of electron filtering. Although FIGS. 6B and 6C illustrate the filter 632 having two filtering zones 632a and 632b, it is appreciated that any number of filtering zones can be implemented in the filter 632.

Figure 6D:
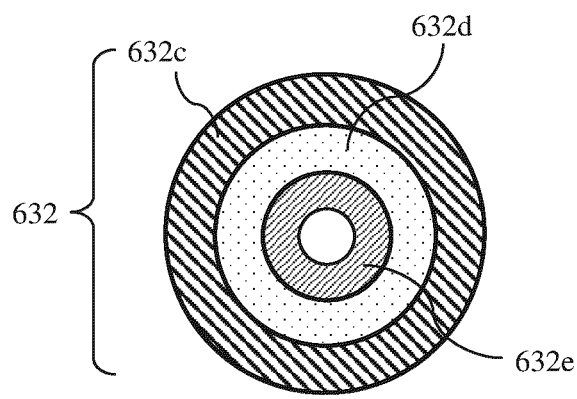

FIG. 6D shows another example of the external passive energy filter 632 having multiple filtering segments. In some embodiments, the external passive energy filter 632 may comprise a center hole allowing a primary beam 304 to pass through and multiple filtering segments (e.g., filtering segments 632c, 632d, and 632e) positioned around the center hole. Each filtering segment 632c, 632d, or 632e may provide a different level of energy barrier. This enables the electron detector (such as electron detector 631 in FIGS. 6A and 6B) to detect signals electrons with different energy levels (e.g., SEs vs. BSEs) in terms of emission radial angles (emission angle with respect to surface normal) thereof and is helpful for defect inspection of some types of samples.

As described above with respect to FIGS. 6A and 6B, the external passive energy filter 632 may be used with the signal electron detector 631, which may comprise an electron detector with a built-in passive energy filter as described in FIGS. 4A-4C, or an electron detector without a built-in passive energy filter.

Figure 6E:
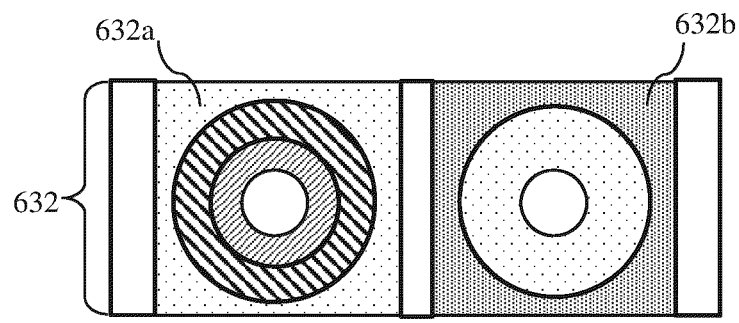

As shown in FIG. 6E, in some embodiments, a movable passive energy filter 632 (such as movable passive energy filter 632 used in apparatus 600B of FIG. 6B) may also comprise multiple filtering segments within each filtering zones 632a and 632b. This enables signal electrons to be detected in terms of various emission angles and emission energy levels. Although FIG. 6E illustrates the filter 632 having two filtering zones 632a and 632b, it is appreciated that any number of filtering zones can be implemented in the filter 632. Similarly, although FIG. 6E illustrates three segments in filtering zone 632a and two segments in filtering zone 632b, it is appreciated that any number of segments can be implemented within each filtering zone.

Figure 6F:
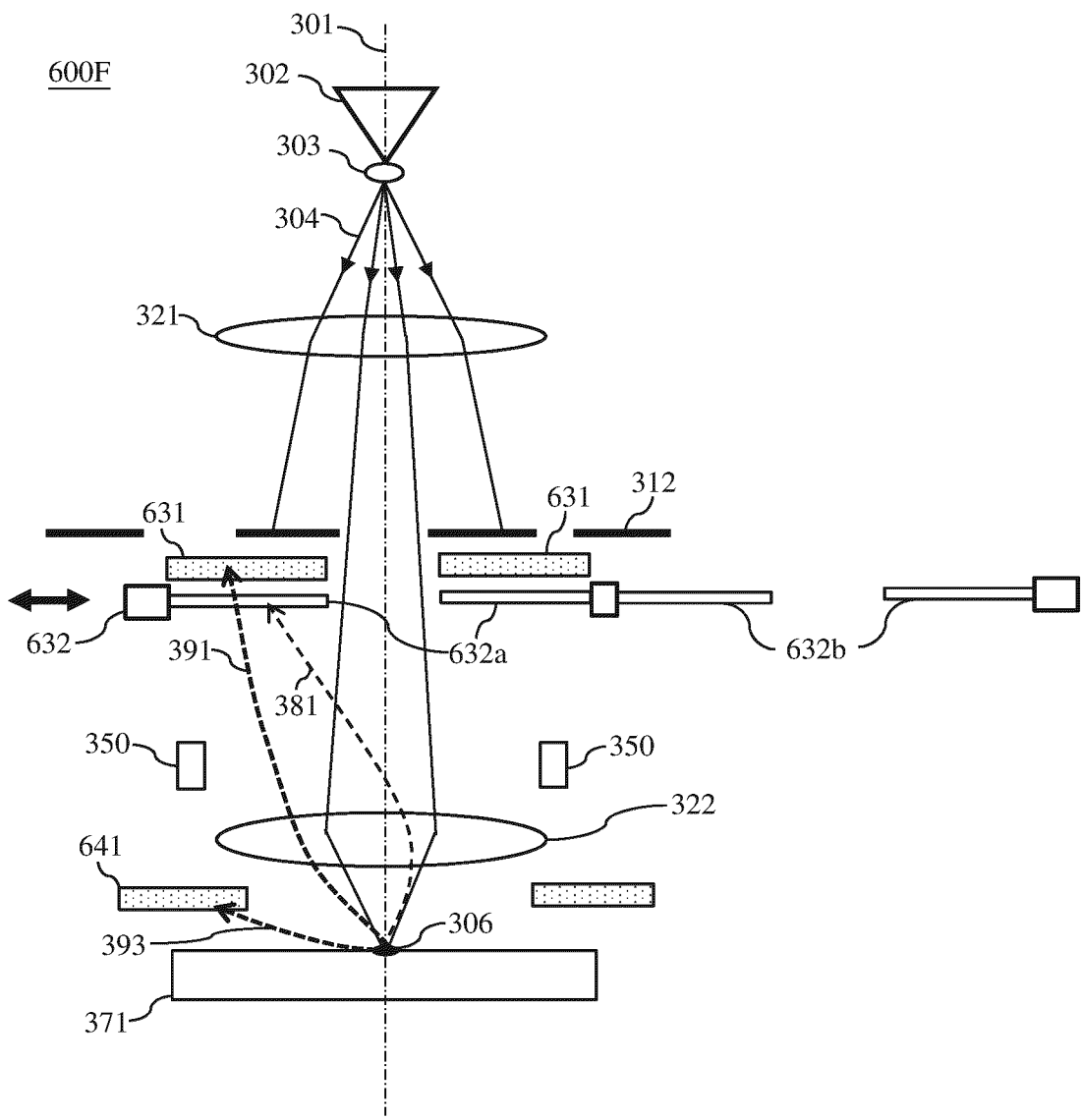

FIG. 6F shows another example (600F) of a charged-particle beam apparatus with a movable passive energy filter 632, consistent with some embodiments of the present disclosure. The movable passive energy filter 632 may have the configuration shown in FIGS. 6C-6E. As described earlier with respect to FIG. 3A, some BSEs (e.g., electrons on path 393) may have large emission angles, so that the objective lens assembly 322 may not able to focus the BSEs 393 onto the electron detector 631. In some embodiments, apparatus 600F may include an additional electron detector 641 to detect those BSEs with large emission angles (e.g., electrons travelling on path 393). Although FIG. 6F shows an apparatus with a movable passive energy filter, the passive energy filter 632 can be implemented as a fixed filter (similar to a passive energy filter 632 shown in FIG. 6A).

Figure 7:
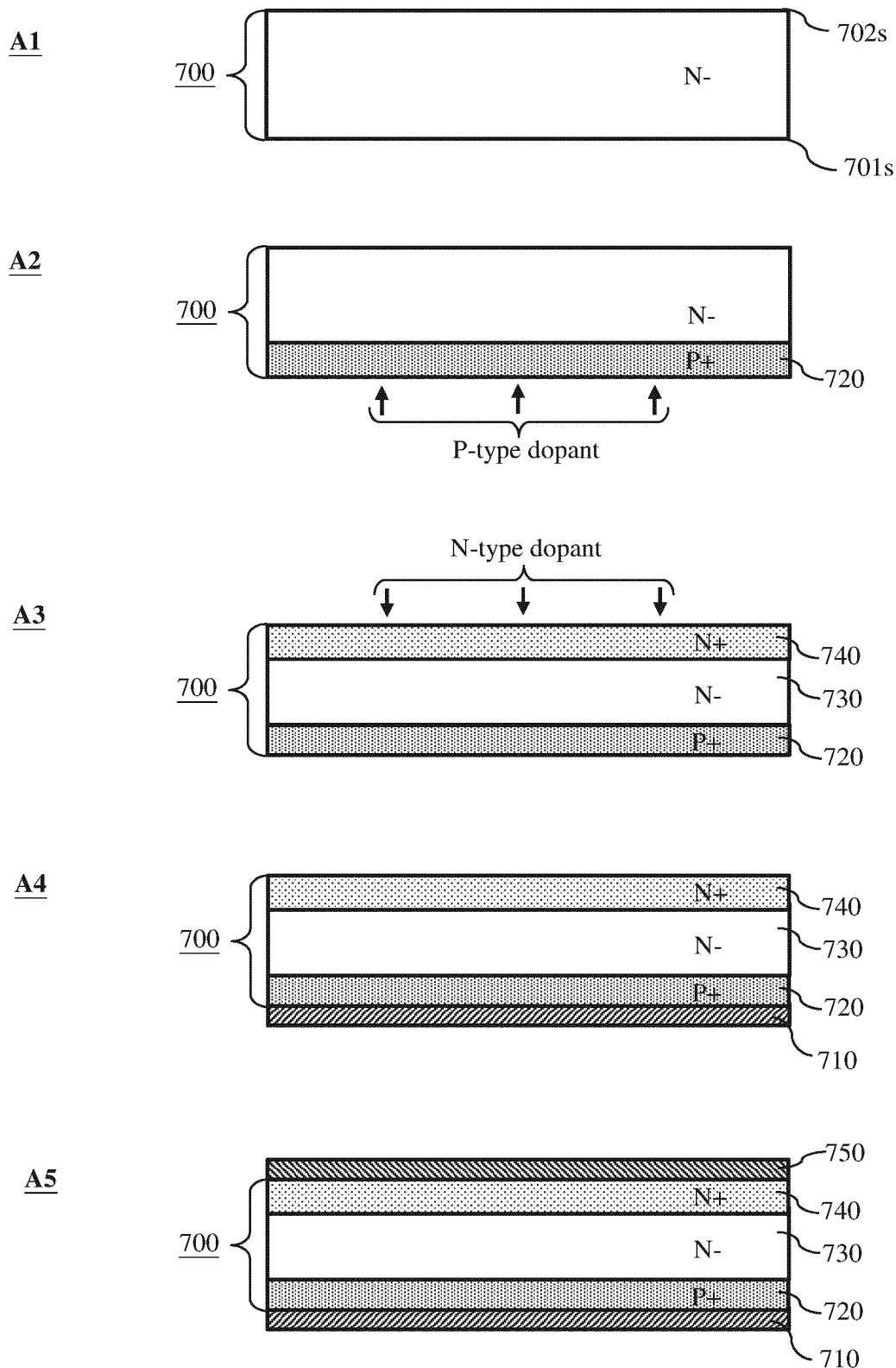
FIG. 7 illustrates an exemplary method of forming the signal electron detector of FIG. 4A, consistent with embodiments of the present disclosure.

Reference is now made to FIG. 7, which illustrates an exemplary method of forming the signal electron detector of FIGS. 4A-4C, consistent with embodiments of the present disclosure.

In step A1, a substrate 700 is provided. The substrate 700 may be a part of a semiconductor wafer having a first surface 701s and a second surface 702s. The substrate 700 may be made of silicon, germanium, or other appropriate semiconductor materials. Although FIG. 7 shows an example process where a lightly doped N– silicon wafer is used as substrate 700, it is appreciated that a different material, e.g., P– doped semiconductor, may be used.

In step A2, a first semiconductor layer 720 is formed in a portion of substrate 700 having the first surface 701s. In some embodiments, first semiconductor layer 720 may comprise a p-type semiconductor. For example, to create first semiconductor layer 720, substrate 700 may be doped with trivalent impurities, such as boron, aluminum, gallium, etc., so as to create free holes. The doping impurities, e.g. boron, may be implanted from the first surface 701s of substrate 700. In some embodiments, first semiconductor layer 720 may be heavily doped, such as a P+ region as shown in FIG. 7.

As described earlier with respect to FIGS. 4A-4C, when the detector is in a normal operation, a nondepleted region (such as nondepleted region 420b of FIG. 4B) of the first semiconductor layer 720 may form an energy barrier that selectively filters out a certain type of incoming signal electrons based on their emission energies. The energy barrier may be increased as the thickness of the nondepleted region increases, and therefore the energy barrier can be varied by changing the thickness of nondepleted region. Among other things, the thickness of nondepleted region may depend on the doping concentration or thickness of first semiconductor layer 720. Accordingly, multiple manufacturing knobs, including the doping concentration and the thickness of first semiconductor layer 720 may be determined before the step A2 based on desired characteristics of the energy filter, such as the level of the energy barrier.

In step A3, a second semiconductor layer 730 and a third semiconductor layer 740 are formed within the body of substrate 700. The third semiconductor layer 740 is formed in a portion of substrate 700 having the second surface 702s. In some embodiments, third semiconductor layer 740 may comprise an n-type semiconductor region. For example, to create third semiconductor layer 740, substrate 700 may be doped with pentavalent impurities, such as phosphorous, antimony, arsenic, etc., so as to create free electrons. The doping impurities, e.g. phosphorous, may be implanted from the second surface 702s of substrate 700. Similar to first semiconductor layer 720, third semiconductor layer 740 may be a heavily doped region, such as a N+ region as shown in FIG. 7.

After the first and third semiconductor layers (720, 740) are formed, the remaining portion between those two layers may become the second semiconductor layer 730. As second semiconductor layer 730 remains undoped or slightly n-doped or p-doped without any significant dopant species present, the layer is referred as an intrinsic semiconductor region. Along with the neighboring P+ region (first semiconductor layer 720) and N+ region (third semiconductor layer 740), the intrinsic semiconductor region (second semiconductor layer 730) forms a PIN region.

When a reverse bias is applied to the detector, a depletion region (such as depletion region 437 of FIG. 4B) may be formed within the PIN region. In some embodiments, the depletion region may exist almost completely within second semiconductor layer 730. Accordingly, the thickness of second semiconductor layer 730, which is one of the factors controlling the thickness of the depletion region, may be determined before the steps A1 and A2 based on the characteristics of incoming signal electrons, e.g., the range of emission energy of the incoming electrons.

In step A4, a first metal layer 710 is formed on the first surface 701s of substrate 700 and adjacent to the first semiconductor layer 720. For example, first metal layer 710 may be deposited on top of first semiconductor layer 720 (the P+ region) after doping impurities are introduced into substrate 700.

First metal layer 710 may be configured to receive signal electrons (not shown). Accordingly, first metal layer 710 may be thin and made of light metal to reduce scattering and the energy loss of the incoming electrons. For example, a material of first metal layer 710 may be aluminum or other metal that is highly conductive and easily penetrable by signal electrons. The thickness and the material of first metal layer 710 may be determined based on a consideration of blocking of particles other than incident electrons to reduce noise or filtering out some signal electrons based on their emission energy (e.g., filtering out SEs with very low emission energy).

In step A5, a second metal layer 750 is formed on the second surface 702s of substrate 700 and adjacent to the third semiconductor layer 740. For example, second metal layer 750 may be deposited on top of second semiconductor layer 740 (the N+ region) after doping impurities are introduced into substrate 700. A material of second metal layer 750 may be metal with high surface conductivity, such as aluminum or copper. Unlike first metal layer 710, in some embodiments, second metal layer 750 may not need to be highly electron penetrable.

Although FIG. 7 illustrate a method describing an exemplary order of manufacturing process forming an electron detector, it is appreciated that some steps could be reordered. For example, the third semiconductor layer 740 may be formed before the first semiconductor layer 720. The first metal layer 710 may be formed before the second metal layer 750.

Aspects of the present disclosure are set out in the following numbered clauses:

1. An electron detector for detecting a plurality of signal electrons generated from a sample, comprising:
   a first semiconductor layer having a first portion and a second portion;
   a second semiconductor layer adjacent to the first semiconductor layer;
   a third semiconductor layer adjacent to the second semiconductor layer;
   a PIN region formed by the first, second, and third semiconductor layers;
   a power supply configured to apply a reverse bias between the first and the third semiconductor layers; and
   a depletion region formed within the PIN region by the reverse bias, the depletion region comprising a portion of the second semiconductor layer, and the depletion region configured to generate a detector signal based on a first subset of the plurality of signal electrons captured within the depletion region,
   wherein the second portion of the first semiconductor layer is not depleted and is configured to provide an energy barrier to block a second subset of the plurality of signal electrons and to allow the first subset of the plurality of signal electrons to pass through to reach the depletion region.
2. The detector of clause 1, wherein the depletion region further comprises the first portion of the first semiconductor layer.
3. The detector of any one of clauses 1 and 2, wherein the depletion region further comprises a portion of the third semiconductor layer.
4. The detector of any one of clauses 1-3, wherein the portion of the second semiconductor layer comprises an entirety of the second semiconductor layer.
5. The detector of any one of clauses 1-4, wherein the first subset of the plurality of signal electrons comprises electrons having sufficiently high energy to pass through the energy barrier.
6. The detector of any one of clauses 1-5, wherein the second subset of the plurality of signal electrons comprises electrons having insufficient energy to pass through the energy barrier.
7. The detector of any one of clauses 1-6, wherein the detector signal is further influenced by a first set of internal electrons that are generated by interactions between the plurality of signal electrons and the second portion of the first semiconductor layer.
8. The detector of clause 7, wherein the first set of internal electrons comprises electrons having sufficiently high energy to pass through the energy barrier.
9. The detector of any one of clauses 7 and 8, wherein the second portion of the first semiconductor layer is further configured to prevent a second set of internal electrons from reaching the depletion region, wherein the second set of internal electrons are generated by interactions between the plurality of signal electrons and the second portion of the first semiconductor layer and have insufficient energy to pass through the energy barrier.
10. The detector of any one of clauses 1-9, wherein the first semiconductor layer is doped with a dopant, and a cutoff energy level of the energy barrier of the first semiconductor layer is determined by a doping concentration in the first semiconductor layer, a thickness of the first semiconductor layer, or a reverse bias voltage applied by the power supply.
11. The detector of any one of clauses 1-10, wherein the detector signal is generated based on an electron-hole pair produced within the depletion region by the first subset of the plurality of signal electrons or the first set of internal electrons.
12. The detector of any one of clauses 1-11, wherein the first semiconductor layer is doped with a p-type dopant, and the second and third semiconductor layers are doped with an n-type dopant.
13. The detector of clause 12, wherein an electric potential near the first semiconductor layer is lower than an electric potential near the third semiconductor layer.
14. The detector of any one of clauses 1-11, wherein the first semiconductor layer is doped with an n-type dopant, and the second and third semiconductor layers are doped with a p-type dopant.
15. The detector of clause 14, wherein an electric potential near the first semiconductor layer is higher than an electric potential near the third semiconductor layer.
16. The detector of any one of clauses 1-15, further comprising:
a first electrode adjacent to the first semiconductor layer and coupled to a first terminal of the power supply; and
a second electrode adjacent to the third semiconductor layer and coupled to a second terminal of the power supply.
17. The detector of clause 16, wherein the first electrode is a part of a first metal layer adjacent to the first semiconductor layer.
18. The detector of any one of clauses 16 and 17, wherein the second electrode is a part of a second metal layer adjacent to the third semiconductor layer.
19. An electron detector for detecting a plurality of signal electrons generated from a sample, comprising:
a first semiconductor layer having a first portion and a second portion;
a second semiconductor layer adjacent to the first semiconductor layer;
multiple segments of a third semiconductor layer, each of the multiple segments being adjacent to the second semiconductor layer,
a PIN region formed by the first, second, and third semiconductor layers;
a power supply configured to apply a reverse bias between the first and the third semiconductor layers; and a depletion region formed within the PIN region by the reverse bias, the depletion region comprising a portion of the second semiconductor layer, and the depletion region configured to generate a plurality of detector signals based on a first subset of the plurality of signal electrons captured within the depletion region, wherein the second portion of the first semiconductor layer is not depleted and is configured to provide an energy barrier to block a second subset of the plurality of signal electrons and to allow the first subset of the plurality of signal electrons to pass through to reach the depletion region.

20. The detector of clause 19, wherein the depletion region further comprises the first portion of the first semiconductor layer.

21. The detector of any one of clauses 19 and 20, wherein the depletion region further comprises a portion of the third semiconductor layer.

22. The detector of any one of clauses 19-21, wherein the portion of the second semiconductor layer comprises an entirety of the second semiconductor layer.

23. The detector of any one of clauses 19-22, wherein the first subset of the plurality of signal electrons comprises electrons having sufficiently high energy to pass through the energy barrier.

24. The detector of any one of clauses 19-23, wherein the second subset of the plurality of signal electrons comprises electrons having insufficient energy to pass through the energy barrier 25. The detector of any one of clauses 19-24, wherein the plurality of detector signals is further influenced by a first set of internal electrons that are generated by interactions between the plurality of signal electrons and the second portion of the first semiconductor layer.

26. The detector of clause 25, wherein the first set of internal electrons comprises electrons having sufficiently high energy to pass through the energy barrier.

27. The detector of any one of clauses 25 and 26, wherein the second portion of the first semiconductor layer is further configured to prevent a second set of internal electrons from reaching the depletion region, wherein the second set of internal electrons are generated by interactions between the plurality of signal electrons and the second portion of the first semiconductor layer and have insufficient energy to pass through the energy barrier.

28. The detector of any one of clauses 19-27, wherein the first semiconductor layer is doped with a dopant, and a cutoff energy level of the energy barrier of the first semiconductor layer is determined by a doping concentration in the first semiconductor layer, a thickness of the first semiconductor layer, or a reverse bias voltage applied by the power supply.

29. The detector of any one of clauses 19-28, wherein the plurality of detector signals is generated based on electron-hole pairs produced within the depletion region by the first subset of the plurality of signal electrons or the first set of internal electrons.

30. The detector of clause 29, wherein one of the plurality of detector signals is generated based on a subset of the electron-hole pairs captured by a corresponding segment of the multiple segments of third semiconductor layer.

31. The detector of clause 30, wherein the corresponding segment is the closest one from a position where the subset of the electron-hole pairs are generated.

32. The detector of clause 30, wherein the corresponding segment is determined by an electric field generated by the reverse bias within the PIN region.

33. The detector of any one of clauses 19-32, wherein the first semiconductor layer is doped with a p-type dopant, and the second semiconductor layer and the multiple segments of third semiconductor layer are doped with an n-type dopant.

34. The detector of clause 33, wherein an electric potential near the first semiconductor layer is lower than an electric potential near the multiple segments of third semiconductor layer.

35. The detector of any one of clauses 19-32, wherein the first semiconductor layer is doped with an n-type dopant, and the second semiconductor layer and the multiple segment of third semiconductor layer are doped with a p-type dopant.

36. The detector of clause 35, wherein an electric potential near the first semiconductor layer is higher than an electric potential near the multiple segments of third semiconductor layer.

37. The detector of any one of clauses 19-36, further comprising:

a first electrode adjacent to the first semiconductor layer and coupled to a first terminal of the power supply;

a second electrode adjacent to one of the multiple segments of the third semiconductor layer and coupled to a second terminal of the power supply; and a third electrode adjacent to another one of the multiple segments of the third semiconductor layer and coupled to the second terminal of the power supply.

38. The detector of clause 37, wherein the first electrode comprises is a part of a first metal layer adjacent to the first semiconductor layer.

39. The detector of any one of clauses 37 and 38, wherein the second electrode and the third electrode are parts of a second metal layer adjacent to the third semiconductor layer.

40. A method for manufacturing an electron detector having an energy barrier that filters out electrons based on the electrons' energy, the method comprising:

providing a semiconductor substrate having:
a first portion;
a second portion adjacent to the first portion; and
a third portion adjacent to the second portion;

forming a first semiconductor layer by doping the first portion of the substrate with a first type of dopant;

forming a third semiconductor layer by doping the third portion of the substrate with a second type of dopant; and forming a second semiconductor layer in the second portion of the substrate, wherein a doping concentration of the first type of dopant in the first semiconductor layer is determined to configure the energy barrier of the electron detector, and a thickness of the first semiconductor layer is determined to further configure the energy barrier of the electron detector.

41. The method of clause 40, wherein the second semiconductor layer is formed in the second portion of the substrate after the first and third portion of the substrate are doped.

42. The method of any one of clauses 40 and 41, wherein the third semiconductor layer has a doping concentration that is higher than a doping concentration in the second semiconductor layer.

43. The method of any one of clauses 40-42, further comprising forming a first metal layer adjacent to the first semiconductor layer.
44. The method of clause 43, wherein the first metal layer is configured to accept a connection from a first terminal of a power supply.
45. The method of clause 44, further comprising forming a second metal layer adjacent to the third semiconductor layer.
46. The method of clause 45, wherein the second metal layer is configured to accept a connection from a second terminal of the power supply.
47. The method of any one of clauses 43-46, wherein the first metal layer comprises a first electrode configured to function as an anode or a cathode.
48. The method of any one of clauses 43-47, wherein the second metal layer comprises a second electrode configured to function as a cathode or an anode.
49. A charged particle beam apparatus for inspecting a sample, comprising:
a charge particle beam source configured to emit a charged particle beam along a primary optical axis;
an objective lens configured to focus the charged particle beam onto the sample; and
an electron detector, according to any one of clauses 1-39, configured to detect a plurality of signal electrons generated from incidence of the charged particle beam onto the sample.
50. The apparatus of clause 49, further comprising a passive energy filter between the electron detector and the sample.
51. The apparatus of clause 49, further comprising a passive energy filter movable between a first position and a second position, wherein:
when the apparatus operates in a high filtering mode, the passive energy filter is positioned in the first position between the sample and the electron detector and is configured to filter out a first subset of the plurality of signal electrons, and
when the apparatus operates in a low filtering mode, the passive energy filter is positioned in the second position away from the electron detector and is configured to allow a second subset of the plurality of signal electrons to pass through to the electron detector, wherein the second subset of the plurality of signal electrons comprises electrons having a similar energy level as the first subset of the plurality of signal electrons.
52. The apparatus of clause 51, wherein the passive energy filter is configured to provide a first external energy barrier in addition to the energy barrier of the electron detector to filter out the subset of the plurality of signal electrons.
53. The apparatus of clause 52, wherein the apparatus, when operating in a high filtering mode, is configured to filter out the subset of the plurality of signal electrons having energies lower than a sum of the energy barrier of the electron detector and the a first externa energy barrier of the passive energy filter.
54. The apparatus of clause 49, further comprising a passive energy filter movable between a first position, a second position, and a third position, the passive energy filter comprising a first filtering zone with a first external energy barrier and a second filtering zone with a second external energy barrier.
55. The apparatus of clause 54, wherein:
when the apparatus operates in a first filtering mode, the passive energy filter is positioned in the first position so that the first filtering zone is positioned between the sample and the electron detector, and is configured to provide the first external energy barrier in addition to the energy barrier of the electron detector,
when the apparatus operates in a second filtering mode, the passive energy filter is positioned in the second position so that the second filtering zone is positioned between the sample and the electron detector, and is configured to provide the second external energy barrier in addition to the energy barrier of the electron detector, and
when the apparatus operates in a third filtering mode, the passive energy filter is positioned in the third position away from the electron detector.
56. The apparatus of any one of clauses 54 and 55, the first external energy barrier is higher than the second external energy barrier.
57. The apparatus of any one of clauses 50-56, wherein the passive energy filter comprises any material capable of attenuating an energy of the plurality of signal electrons.
58. The apparatus of any one of clauses 50-57, wherein the passive energy filter comprises semiconductor materials or conductor materials.
59. The apparatus of clause 49, further comprising a passive energy filter comprising a plurality of filtering segments, each of the plurality of filtering segments is configured to provide a different level of energy barriers.
60. The apparatus of clause 59, wherein the passive energy filter is movable.
61. A charged particle beam apparatus for inspecting a sample, comprising:
a charge particle beam source configured to emit a charged particle beam along a primary optical axis;
an objective lens configured to focus the charged particle beam onto the sample;
an electron detector configured to detect a plurality of signal electrons generated from incidence of the charged particle beam onto the sample; and
a passive energy filter between the electron detector and the sample.
62. The apparatus of clause 61, wherein the passive energy filter is movable between a first position and a second position, wherein:
when the apparatus operates in a high filtering mode, the passive energy filter is positioned in the first position between the sample and the electron detector and is configured to filter out a subset of the plurality of signal electrons, and
when the apparatus operates in a low filtering mode, the passive energy filter is positioned in the second position away from the electron detector and is configured to allow the subset of the plurality of signal electrons to pass through to the electron detector.
63. The apparatus of any one of clauses 61 and 62, wherein the electron detector comprises an electron detector according to any one of clauses 1-39.
64. The apparatus of any one of clauses 61-63, wherein the passive energy filter is configured to provide a first external energy barrier to filter out the subset of the plurality of signal electrons
65. The apparatus of clause 64, wherein the apparatus, when operating in a high filtering mode, is configured to filter out the subset of the plurality of signal electrons having energies lower than the first external energy barrier of the passive energy filter.
66. The apparatus of any one of clauses 61-65, wherein the passive energy filter comprises a plurality of filtering segments, each of the plurality of filtering segments is configured to provide a different level of energy barrier.
67. The apparatus of any one of clauses 61-66, wherein the passive energy filter comprises material capable of attenuating an energy of the plurality of signal electrons.
68. The apparatus of any one of clauses 61-67, wherein the passive energy filter comprises semiconductor materials or conductor materials.
69. An electron detector for detecting a plurality of signal electrons generated from a sample, comprising:
a first semiconductor layer having a first portion and a second portion;
a second semiconductor layer adjacent to the first semiconductor layer;
a third semiconductor layer adjacent to the second semiconductor layer;
a PIN region formed by the first, second, and third semiconductor layers; and
a depletion region formed by a reverse bias applied to the PIN region, the depletion region comprising a portion of the second semiconductor layer, and the depletion region configured to generate a detector signal based on a first subset of the plurality of signal electrons captured within the depletion region,
wherein the second portion of the first semiconductor layer is not depleted and is configured to provide an energy barrier to block a second subset of the plurality of signal electrons and to allow the first subset of the plurality of signal electrons to pass through to reach the depletion region.
70. The detector of clause 69, wherein the depletion region further comprises the first portion of the first semiconductor layer.
71. The detector of any one of clauses 69 and 70, wherein the depletion region further comprises a portion of the third semiconductor layer.
72. The detector of any one of clauses 69-71, wherein the portion of the second semiconductor layer comprises an entirety of the second semiconductor layer.
73. The detector of any one of clauses 69-72, wherein the first subset of the plurality of signal electrons comprises electrons having sufficiently high energy to pass through the energy barrier.
74. The detector of any one of clauses 69-73, wherein the second subset of the plurality of signal electrons comprises electrons having insufficient energy to pass through the energy barrier.
75. The detector of any one of clauses 69-74, wherein the detector signal is generated based on a first set of internal electrons that are generated by interactions between the plurality of signal electrons and the second portion of the first semiconductor layer.
76. The detector of clause 75, wherein the first set of internal electrons comprises electrons having sufficiently high energy to pass through the energy barrier.
77. The detector of any one of clauses 75 and 76, wherein the second portion of the first semiconductor layer is further configured to prevent a second set of internal electrons from reaching the depletion region, wherein the second set of internal electrons are generated by interactions between the plurality of signal electrons and the second portion of the first semiconductor layer and have insufficient energy to pass through the energy barrier.
78. The detector of any one of clauses 69-77, wherein the first semiconductor layer is doped with a dopant, and a cutoff energy level of the energy barrier of the first semiconductor layer is determined by a doping concentration in the first semiconductor layer or a thickness of the first semiconductor layer.
79. The detector of any one of clauses 69-78, wherein the detector signal is generated based on an electron-hole pair produced within the depletion region by the first subset of the plurality of signal electrons.
80. An electron detector for detecting a plurality of signal electrons generated from a sample, comprising:
a first semiconductor layer having a first portion and a second portion;
a second semiconductor layer adjacent to the first semiconductor layer;
multiple segments of a third semiconductor layer, each of the multiple segments being adjacent to the second semiconductor layer,
a PIN region formed by the first, second, and third semiconductor layers; and
a depletion region formed by a reverse bias applied to the PIN region, the depletion region comprising a portion of the second semiconductor layer, and the depletion region configured to generate a plurality of detector signals based on a first subset of the plurality of signal electrons captured within the depletion region,
wherein the second portion of the first semiconductor layer is not depleted and is configured to provide an energy barrier to block a second subset of the plurality of signal electrons and to allow the first subset of the plurality of signal electrons to pass through to reach the depletion region.
81. The detector of clause 80, wherein the depletion region further comprises the first portion of the first semiconductor layer.
82. The detector of any one of clauses 80 and 81, wherein the depletion region further comprises a portion of the third semiconductor layer.
83. The detector of any one of clauses 80-82, wherein the portion of the second semiconductor layer comprises an entirety of the second semiconductor layer.
84. The detector of any one of clauses 80-83, wherein the first subset of the plurality of signal electrons comprises electrons having sufficiently high energy to pass through the energy barrier.
85. The detector of any one of clauses 80-84, wherein the second subset of the plurality of signal electrons comprises electrons having insufficient energy to pass through the energy barrier.
86. The detector of any one of clauses 80-85, wherein the plurality of detector signals is generated based on a first set of internal electrons that are generated by interactions between the plurality of signal electrons and the second portion of the first semiconductor layer.
87. The detector of clause 86, wherein the first set of internal electrons comprises electrons having sufficiently high energy to pass through the energy barrier.
88. The detector of any one of clauses 86 and 87, wherein the second portion of the first semiconductor layer is further configured to prevent a second set of internal electrons from reaching the depletion region, wherein the second set of internal electrons are generated by interactions between the plurality of signal electrons and the second portion of the first semiconductor layer and have insufficient energy to pass through the energy barrier.

89. The detector of any one of clauses 80-88, wherein the first semiconductor layer is doped with a dopant, and a cutoff energy level of the energy barrier of the first semiconductor layer is determined by a doping concentration in the first semiconductor layer or a thickness of the first semiconductor layer.

90. The detector of any one of clauses 80-89, wherein the plurality of detector signals is generated based on electron-hole pairs produced within the depletion region by the first subset of the plurality of signal electrons.

91. The detector of clause 90, wherein one of the plurality of detector signals is generated based on a subset of the electron-hole pairs captured by a corresponding segment of the multiple segments of third semiconductor layer.

92. The detector of clause 91, wherein the corresponding segment is the closest one from a position where the subset of the electron-hole pairs are generated.

93. The detector of clause 91, wherein the corresponding segment is determined by an electric field generated by the reverse bias within the PIN region.

A non-transitory computer readable medium may be provided that stores instructions for a processor of a controller (e.g., controller 50 of FIG. 1) to carry out charged particle beam detection, image processing, adjusting bias voltage, switching between various filtering modes, moving an external passive energy filter (such as filter 632 of FIGS. 6A-6E) or other functions and methods consistent with the present disclosure, etc. Common forms of non-transitory media include, for example, a floppy disk, a flexible disk, hard disk, solid state drive, magnetic tape, or any other magnetic data storage medium, a Compact Disc Read Only Memory (CD-ROM), any other optical data storage medium, any physical medium with patterns of holes, a Random Access Memory (RAM), a Programmable Read Only Memory (PROM), and Erasable Programmable Read Only Memory (EPROM), a FLASH-EPROM or any other flash memory, Non-Volatile Random Access Memory (NVRAM), a cache, a register, any other memory chip or cartridge, and networked versions of the same.

It will be appreciated that the embodiments of the present disclosure are not limited to the exact construction that has been described above and illustrated in the accompanying drawings, and that various modifications and changes may be made without departing from the scope thereof. The present disclosure has been described in connection with various embodiments, other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The descriptions above are intended to be illustrative, not limiting. Thus, it will be apparent to one skilled in the art that modifications may be made as described without departing from the scope of the claims set out below.

The invention claimed is:

1. An electron detector for detecting a plurality of signal electrons generated from a sample, comprising:
    a first semiconductor layer having a first portion and a second portion;
    a second semiconductor layer adjacent to the first semiconductor layer;
    a third semiconductor layer adjacent to the second semiconductor layer;
    a PIN region formed by the first, second, and third semiconductor layers;
    a power supply configured to apply a reverse bias between the first and the third semiconductor layers; and
    a depletion region formed within the PIN region by the reverse bias, the depletion region comprising a portion of the second semiconductor layer, and the depletion region configured to generate a detector signal based on a first subset of the plurality of signal electrons captured within the depletion region,
    wherein the second portion of the first semiconductor layer is not depleted and is configured to provide an energy barrier to block a second subset of the plurality of signal electrons and to allow the first subset of the plurality of signal electrons to pass through to reach the depletion region.

2. The detector of claim 1, wherein the depletion region further comprises the first portion of the first semiconductor layer.

3. The detector of claim 1, wherein the depletion region further comprises a portion of the third semiconductor layer.

4. The detector of claim 1, wherein the portion of the second semiconductor layer comprises an entirety of the second semiconductor layer.

5. The detector of claim 1, wherein the first subset of the plurality of signal electrons comprises electrons having sufficiently high energy to pass through the energy barrier.

6. The detector of claim 1, wherein the second subset of the plurality of signal electrons comprises electrons having insufficient energy to pass through the energy barrier.

7. The detector of claim 1, wherein the detector signal is further influenced by a first set of internal electrons that are generated by interactions between the plurality of signal electrons and the second portion of the first semiconductor layer.

8. The detector of claim 7, wherein the first set of internal electrons comprises electrons having sufficiently high energy to pass through the energy barrier.

9. The detector of claim 7, wherein the second portion of the first semiconductor layer is further configured to prevent a second set of internal electrons from reaching the depletion region, wherein the second set of internal electrons are generated by interactions between the plurality of signal electrons and the second portion of the first semiconductor layer and have insufficient energy to pass through the energy barrier.

10. The detector of claim 1, wherein the first semiconductor layer is doped with a dopant, and a cutoff energy level of the energy barrier of the first semiconductor layer is determined by a doping concentration in the first semiconductor layer, a thickness of the first semiconductor layer, or a reverse bias voltage applied by the power supply.

11. The detector of claim 1, wherein the detector signal is generated based on an electron-hole pair produced within the depletion region by the first subset of the plurality of signal electrons or the first set of internal electrons.

12. The detector of claim 1, wherein the first semiconductor layer is doped with a p-type dopant, and the second and third semiconductor layers are doped with an n-type dopant.

13. The detector of claim 12, wherein an electric potential near the first semiconductor layer is lower than an electric potential near the third semiconductor layer.

14. The detector of claim 1, wherein the first semiconductor layer is doped with an n-type dopant, and the second and third semiconductor layers are doped with a p-type dopant.

15. A method for manufacturing an electron detector having an energy barrier that filters out electrons based on the electrons' energy, the method comprising:
providing a semiconductor substrate having:
a first portion;
a second portion adjacent to the first portion; and
a third portion adjacent to the second portion;
forming a first semiconductor layer by doping the first portion of the substrate with a first type of dopant;
forming a third semiconductor layer by doping the third portion of the substrate with a second type of dopant; and
forming a second semiconductor layer in the second portion of the substrate,
wherein a doping concentration of the first type of dopant in the first semiconductor layer is determined to configure the energy barrier of the electron detector, and
a thickness of the first semiconductor layer is determined to further configure the energy barrier of the electron detector.

16. A charged particle beam apparatus for inspecting a sample, comprising:
a charge particle beam source configured to emit a charged particle beam along a primary optical axis;
an objective lens configured to focus the charged particle beam onto the sample; and
an electron detector, according to claim 1, configured to detect a plurality of signal electrons generated from incidence of the charged particle beam onto the sample.

17. The apparatus of claim 16, further comprising a passive energy filter between the electron detector and the sample.

18. The apparatus of claim 16, further comprising a movable passive energy filter configured to be positioned between the sample and the electron detector and filter out a first subset of the plurality of signal electrons.

19. The apparatus of claim 18, wherein the movable passive energy filter is configured to provide a first external energy barrier in addition to the energy barrier of the electron detector, wherein a sum of the energy barrier of the electron detector and the first external energy barrier of the movable passive energy filter is higher than an energy level of the first subset of the plurality of signal electrons.

20. The apparatus of claim 18, wherein the movable passive energy filter is configured to be positioned off the primary optical axis away from the electron detector and to allow a second subset of the plurality of signal electrons to pass through to the electron detector, wherein the second subset of the plurality of signal electrons comprises electrons having a similar energy level as the first subset of the plurality of signal electrons.

* * * * *